(12) United States Patent
Lee et al.

(10) Patent No.: US 6,826,137 B1
(45) Date of Patent: Nov. 30, 2004

(54) APPARATUS AND METHOD FOR AUTHENTICATION/COPY PROTECTION OF OPTICAL STORAGE MEDIUM AND THE OPTICAL STORAGE MEDIUM

(75) Inventors: Jae-Sun Lee, Kyunggido (KR); Woon-Sung Yeo, Chungju (KR); Yong-Hoo Sheen, Kyunggido (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 09/377,499

(22) Filed: Aug. 20, 1999

Related U.S. Application Data

(63) Continuation-in-part of application No. 09/112,982, filed on Jul. 10, 1998, now Pat. No. 6,452,885.

(30) Foreign Application Priority Data

Aug. 22, 1998 (KR) .............................................. 98-34342

(51) Int. Cl.[7] .............................................. G11B 7/00
(52) U.S. Cl. ............................... 369/53.21; 369/47.12; 369/47.53
(58) Field of Search ........................... 369/47.1, 47.12, 369/47.5, 47.53, 53.1, 53.2, 53.21, 59.1, 83, 84, 275.1, 275.5

(56) References Cited

U.S. PATENT DOCUMENTS

| 4,849,836 A | 7/1989 | Kachikian |
| 5,696,757 A | 12/1997 | Ozaki et al. |
| 5,991,499 A | 11/1999 | Yagasaki et al. ............... 386/94 |
| 6,058,087 A | 5/2000 | Tomita .................... 369/47.22 |

*Primary Examiner*—Muhammad Edun
(74) *Attorney, Agent, or Firm*—Birch, Stewart, Kolasch & Birch, LLP

(57) ABSTRACT

The method of recording data in a copy protected manner on an optical disk modifies at least a first signal in a data such that the modified first signal is reproduced as one of a plurality of target signals prior to error correction decoding. The method also includes error correction encoding the data prior to the modifying such that the reproduced target signals remain unchanged after error correction decoding. And, the modified encoded data is written on an optical storage medium.

27 Claims, 21 Drawing Sheets

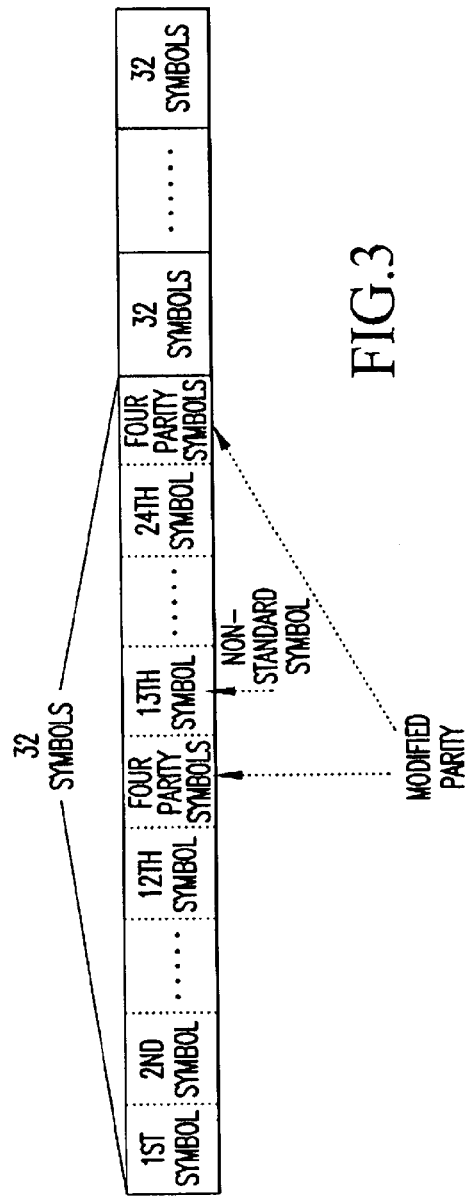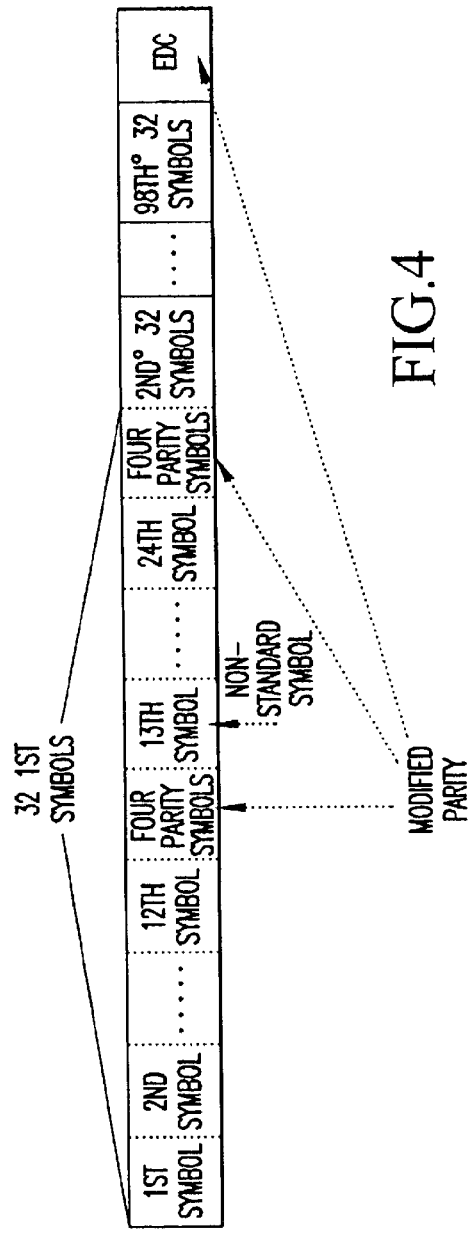

| | data | parity |
|---|---|---|
| A code | 0  0  ⋯  0  x  0  0  ⋯⋯  0 | c  d  e  f |
| B code | 0  0  ⋯  0  y  0  0  ⋯⋯  0 | g  h  i  j |
| recoded data | 0  0  ⋯  0  z  0  0  ⋯⋯  0 | c  d  i  j |

FIG.5A

| | data | parity |
|---|---|---|
| A code | 0  x  ⋯  0  x  x  0  ⋯  x  ⋯⋯  0 | c  d  e  f |
| B code | 0  y  ⋯  0  y  y  0  ⋯  y  ⋯⋯  0 | g  h  e  f |
| recoded data | 0  z  ⋯  0  z  z  0  ⋯  z  ⋯⋯  0 | c  h  e  f |

FIG.5B

| | data | parity | probabilty |
|---|---|---|---|
| A code | 0 0 ...... 0 x 0 0 ...... 0 | c d e f | |
| B code | 0 0 ...... 0 y 0 0 ...... 0 | g h i j | |
| recoded data | 0 0 ...... 0 z 0 0 ...... 0 | c d i j | |
| reproduced data 1 | 0 0 ...... 0 x 0 0 ...... 0 | c d i j | $P(x)$ |
| reproduced data 2 | 0 0 ...... 0 y 0 0 ...... 0 | c d i j | $P(y) = 1 - P(x)$ |
| error-corrected data 1 | 0 0 ...... 0 x 0 0 ...... 0 | c d e f | $P'(x) = P(x)$ |
| error-corrected data 2 | 0 0 ...... 0 y 0 0 ...... 0 | g h i j | $P'(y) = 1 - P(x)$ |

FIG.8A

| | data | parity | Probability |
|---|---|---|---|
| A code | 0 x .. 0 x x 0 .. x | 0 c d e f | |
| B code | 0 y .. 0 y y 0 .. y | 0 g h e f | |
| recoded data | 0 z .. 0 z z 0 .. z | 0 c h e f | |
| reproduced data 1 | 0 x .. 0 x x 0 .. x | 0 c h e f | $(P(x))^n$ |
| reproduced data 2 | 0 y .. 0 y y 0 .. y | 0 c h e f | $(P(y))^n = 1 - ((P(x))^n$ |
| error-corrected data 1 | 0 x .. 0 x x 0 .. x | 0 c d e f | $(P(x))^n$ |
| error-corrected data 2 | 0 y .. 0 y y 0 .. y | 0 g h e f | $(P(y))^n = 1 - ((P(x))^n$ |

FIG.8B

| | data | parity | Probability |
|---|---|---|---|
| A code | 0 x . 0 x x x 0 . x x | 0 c d e f | |
| B code | 0 y . 0 y y y 0 . y y | 0 c d e f | |
| recoded data | 0 z . 0 z z z 0 . z z | 0 c d e f | |
| reproduced data 1 | 0 x . 0 x x x 0 . x x | 0 c d e f | $(P(x))^n$ |
| reproduced data 2 | 0 y . 0 y y y 0 . y y | 0 c d e f | $(P(y))^n = 1 - ((P(x))^n$ |
| error-corrected data 1 | 0 x . 0 x x x 0 . x x | 0 c d e f | $(P(x))^n$ |
| error-corrected data 2 | 0 y . 0 y y y 0 . y y | 0 c d e f | $(P(y))^n = 1 - ((P(x))^n$ |

FIG.8C

| No | C1 mode | C2 mode | C1 parity pattern | C2 parity pattern | probability of CIRC ouput data |
|---|---|---|---|---|---|
| 1 : | e : 2. D : 0 | e : 2. D : 0 | $c_1 d_1 i_1 j_{1_1}$ | $c_2 d_2 i_2 j_2$ | $x : P(x)$, $y : 1 - P(x)$ |
| 2 : | | e : 1. D : 2 | $c_i d_i i_i j_i$ | c h e f | $x : (P(x))^n$, $y : (1 - P(x))^n$ |
| 3 : | | e : 0. D : 4 | $c_i d_i i_i j_i$ | c d e f | $x : (P(x))^m$, $y : (1 - P(x))^m$ |
| 4 : | e : 1. D : 2 | e : 2. D : 0 | c h e f | $c_i d_i i_i j_i$ | $x : (P(x))^n$, $y : (1 - P(x))^n$ |
| 5 : | | e : 1. D : 2 | $c_i h_i e_i f_i$ | $c_i h_i e_i f_i$ | $x : (P(x))^{n*n}$, $y : (1 - P(x))^{n*n}$ |
| 6 : | | e : 0. D : 4 | $c_i h_i e_i f_i$ | c d e f | $x : (P(x))^{m*n}$, $y : (1 - P(x))^{m*n}$ |
| 7 : | e : 0. D : 4 | e : 2. D : 0 | c d e f | $c_i d_i i_i j_i$ | $x : (P(x))^m$, $y : (1 - P(x))^m$ |
| 8 : | | e : 1. D : 2 | c d e f | c h e f | $x : (P(x))^{m*n}$, $y : (1 - P(x))^{m*n}$ |
| 9 : | | e : 0. D : 4 | $c_i d_i e_i f_i$ | c d e f | $x : (P(x))^{m*m}$, $y : (1 - P(x))^{m*m}$ |

FIG.10

APPARATUS AND METHOD FOR AUTHENTICATION/COPY PROTECTION OF OPTICAL STORAGE MEDIUM AND THE OPTICAL STORAGE MEDIUM

This application is a continuation-in-part of application Ser. No. 09/112,982, filed Jul. 10, 1998 now U.S. Pat. No. 6,452,885, entitled "COPY PROTECTION SYSTEM AND METHOD FOR OPTICAL DISK AND A COPY PROTECTED OPTICAL DISK," the entirety of which is hereby incorporated by reference.

BACKGROUND OF THE INVENTION

1. Field of the Invention

The present invention relates generally to an apparatus and method for authentication/copy protection of optical storage medium, and the optical storage medium.

2. Brief Description of the Related Art

As information storage medium in the multimedia environment, optical discs have been widely used for storage of music, movies, and software due to their high storage capacity. The optical disc has several advantages over other storage media in that mass-production is possible at a low price, and the quality of the information thereon is not degraded upon copying the disc repeatedly.

Because low-price copy machines have been released to the market, the digital information on the optical disc can be copied perfectly and easily, resulting in enormous economic loss due to illegal copying of the information such as music, movies, and software.

Thus, many methods have been proposed to inhibit or limit the illegal copying of the optical discs. As one of them, Korean Patent Application S/N. 97-32576, proposed by these inventors, discloses a signal recording method for optical disc having a copy-protection function and copy protection of the optical disc based on the recording method.

In the method, a non-standard symbol, which is made by shifting or delaying one bit of a chosen standard symbol or codeword by a predetermined length, is written on a specified area of the optical disc. The optical disc turns out to be genuine if the non-standard symbol is reproduced as either of two standard symbols (hereinafter referred to as "target symbols") whenever it is read out repeatedly.

In cases of CD-ROM or CD-DA driver, signals read out from the optical discs are fed to an EFM (Eight to Fourteen Modulation) demodulator, and are then error-corrected in a CIRC (Cross Interleave Reed-Solomon Code) fashion. When the non-standard symbols are processed by the ECC (Error Correction Code) decoder of the CIRC type, even if either of the two target symbols are reproduced from the non-standard symbols, the two target symbols may be considered an error symbol and corrected by the ECC decoder. Thus, the desired authentication of the optical disc may fail.

SUMMARY OF THE INVENTION

Accordingly, a general objective of the present invention is to solve the above mentioned problems and to provide an apparatus and method for authentication/copy protection of optical storage medium that is compatible with existing drivers for optical storage media.

A more specific object of the present invention is to provide an apparatus and method for authentication/copy protection of optical storage medium that enables any optical storage medium driver to perform the authentication operation without installation of additional software/hardware.

Another specific object of the present invention is to provide an apparatus and method for authentication/copy protection of optical storage medium that enables correct authentication operation even when a set of symbols containing non-standard symbols undergoes error-correction by an ECC decoder after a read-out operation.

Another specific object of the present invention is to provide an apparatus and method for authentication/copy protection of optical storage medium that enables a correct decision as to whether or not the optical storage medium is genuine by preserving standard symbols, which are obtained through repetitive read-out of the non-standard symbol from the optical storage medium, during in the ECC decoding process.

Another specific object of the present invention is to provide an apparatus and method for authentication/copy protection of optical storage medium in which symbols that are needed for the authentication operation are obtained due to intentional modification of parity symbols; the modification being determined in consideration of the error correction capability of an ECC decoder.

These and other objects are achieved by providing a method of recording data in a copy protected manner on an optical disk, comprising modifying at least a first signal in data such that said modified first signal is reproduced as one of a plurality of target signals prior to error correction decoding, error correcting encoding said data prior to said modifying such that said reproduced target signals remain unchanged after error correction decoding, and writing said modified encoded data on an optical storage medium.

These and other objects are further achieved by providing a method of recording data in a copy protected manner on an optical disk, comprising choosing at least one pair of standard symbols from a list containing a plurality of pairs of standard symbols, each pair of standard symbols in said list including a first symbol and a second symbol differing by a number of zeros between consecutive ones, first generating first and second codes, said first code including at least one of said first symbol in said chosen pair of standard symbols and said second code including at least one of said second symbol in said chosen pair of standard symbols, second generating first and second parity symbols for said first and second codes, respectively, first modifying said first parity symbols, second modifying said first symbols in said first code, and writing said modified first code on an optical disk.

These and other objects are still further achieved by a copy protected recording medium having a data structure stored thereon, comprising a test area storing test data, said test data including at least one modified first signal, said modified first signal having been modified such that when said modified first signal is reproduced, said modified first signal is reproduced as one of at least two target signals.

These and other objects are also achieved by the copy protected recording medium, wherein said test data includes a first code, said first code including said modified first signal and modified first parity symbols, said modified first parity symbols including at least one symbol in common with parity symbols of a first target code and a second target code, said first and second target codes being a same code except said first target code includes said first target signal at predetermined position and said second target code includes said second target signal at said predetermined position.

These and other objects are additionally achieved by providing an apparatus for recording data in a copy protected manner on an optical disk, comprising a shifter modifying at least a first signal in data such that said modified first signal is reproduced as one of a plurality of target signals prior to error correction decoding, an encoder error correcting encoding said data prior to said modifying such that said reproduced target signals remain unchanged after error correction decoding, and a mastering apparatus writing said modified encoded data on an optical storage medium.

These and other objects are further achieved by providing an apparatus for recording data in a copy protected manner on an optical disk, comprising an encoder generating first and second parity symbols for first and second codes, respectively, said first code including at least one of a first symbol and said second code including at least one of a second symbol, said first symbol and said second symbol differing by a number of zeros between consecutive ones, said encoder modifying said first parity symbols, a shifter modifying said first symbols in said first code, and a mastering apparatus writing said modified first code on an optical disk.

BRIEF DESCRIPTION OF THE DRAWINGS

The accompanying drawings, which are included to provide a further understanding of the invention, illustrate preferred embodiments of this invention, and together with the description, serve to explain the principles of the present invention.

In the drawings:

FIG. 3 is an embodiment of the format of the test data according to the present invention;

FIG. 4 is another embodiment of the format of the test data according to the present invention;

FIGS. 5A and 5B are tables illustrating the method of parity modification employed by the modified parity generator of FIG. 1;

FIGS. 8A to 8C are tables illustrating procedures in which target data are obtained from the recorded test data through reproduction and error correction according to the present invention;

FIG. 10 is a table showing probabilities that each of the target data is obtained from recorded test data depending on the error correction mode of CIRC decoder;

DETAILED DESCRIPTION OF THE PREFERRED EMBODIMENTS

The preferred embodiments of the present invention will be described in detail referring to the accompanying drawings.

Figure 1:
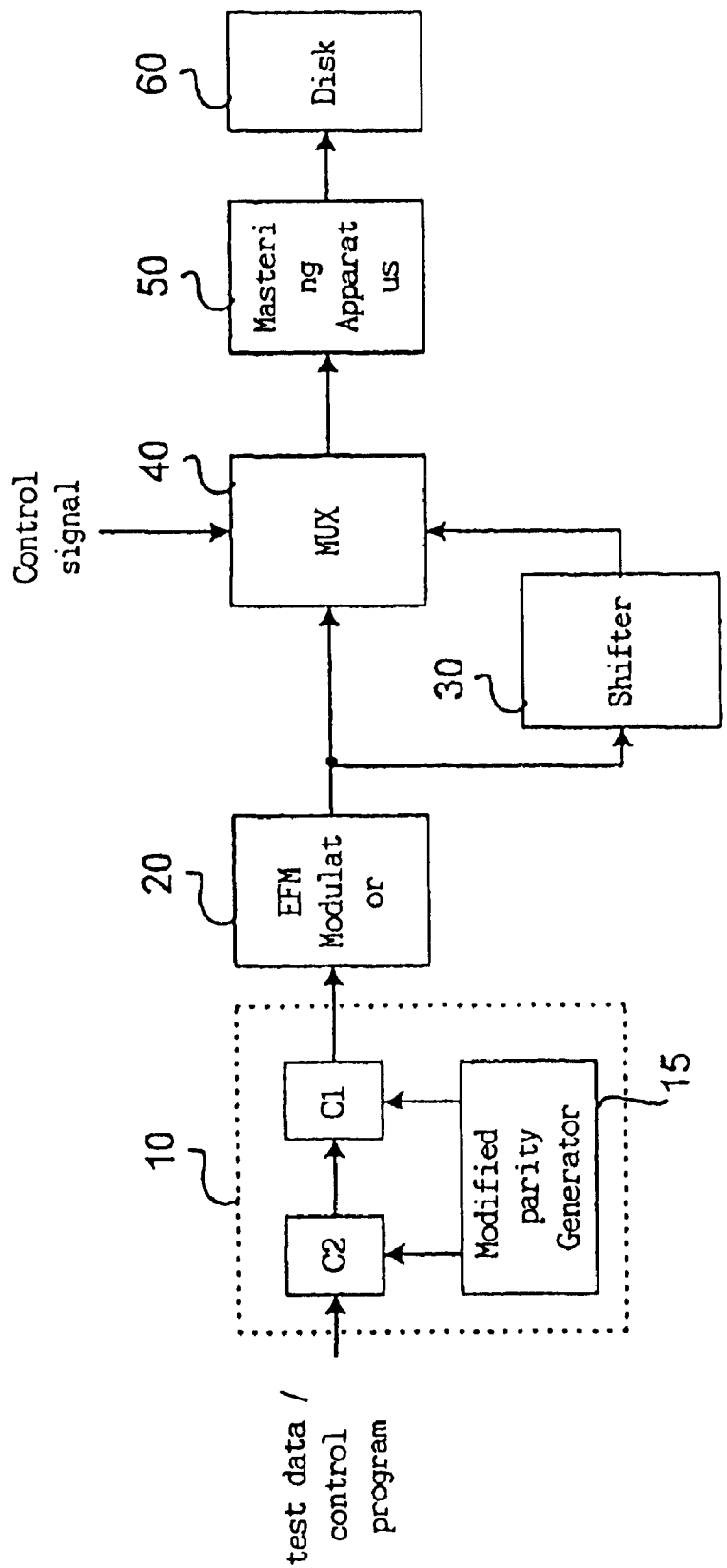
FIG. 1 is a schematic diagram of a data writing device which is used in the apparatus for authentication/copy protection of optical storage medium according to the present invention.

Referring to FIG. 1, there is shown a block diagram of a data writing device, which is used in the apparatus for authentication/copy protection of optical storage medium in accordance with the present invention. The device includes a CIRC encoder 10 for encoding error correction codes to the input data; an EFM modulator 20 for block-converting the CIRC-encoded 8-bit data to a pattern of 14 bits; a shifter 30 for delaying a portion of the EFM-modulated data by a predetermined length; and a MUX 40 for selecting one of the EFM-modulated data and the delayed data to output to a mastering apparatus 50. The shifter 30 is used to delay a bit of the EFM-modulated data by, say, less than 0.5 T.

Figure 6:
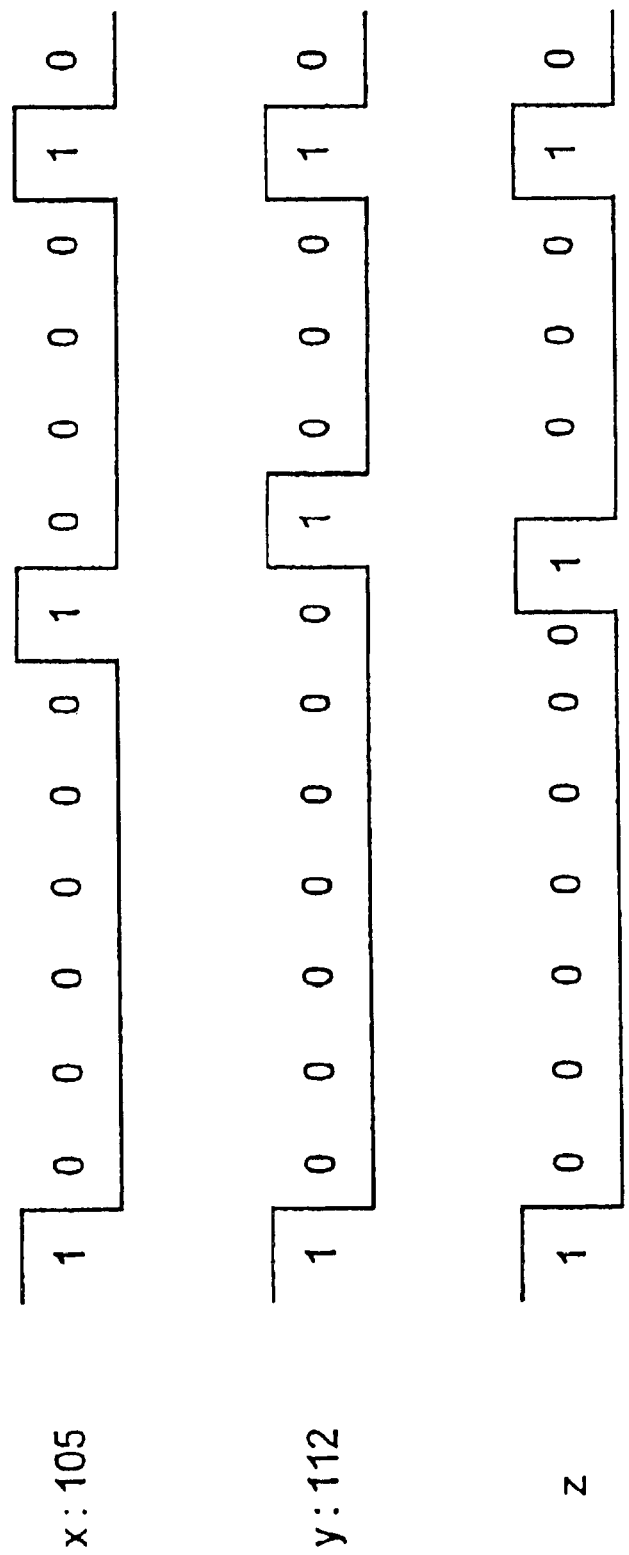
FIG. 6 illustrates a non-standard code and corresponding two target standard codes according to the present invention.

The mastering apparatus 50 has a laser cutting precision of about less than 0.5T so that delayed pits of less than 0.5T, like the 9-th bit in symbol z shown in FIG. 6, can be written to an optical storage medium (1T refers to the pit length recognized as a "0"). With conventional mastering apparatuses, the symbol z of FIG. 6 is written as either symbol x or symbol y shown in FIG. 6 due to their coarse precision.

The CIRC encoder 10 consists of two stages of ECC encoding using Reed-Solomon codes. One stage is called a C2 encoder, which encodes the input data of 24 bytes by using 4-byte parity, and the other stage is called a C1 encoder, which encodes the resulting 28-byte data (the data of 24 bytes and the C2 parity of 4 bytes) by using 4-byte parity. Under the control of a modified parity generator 15, the C2 encoder generates a "modified" parity of 4 bytes by modifying the parity generated by the original Reed-Solomon encoding algorithm, and inserts the modified parity at the center of the input data of 24 bytes. Then, the resulting 28 bytes are fed to the C1 encoder, where, under the control of the modified parity generator 15, another "modified" parity of 4 bytes is placed by the C1 encoder at the end of the 28-byte data, resulting in a 32-byte data.

In the step of ECC encoding by the CIRC encoder 10, the modified parity symbols are added to test data (a group of symbols) that contains one or more non-zero symbols. Then, the ECC-encoded test data is 8-to-14 modulated by the EFM modulator 20, and each of the non-zero symbols is converted by the shifter 30 to a non-standard symbol by shifting a portion of the symbol by a predetermined length. The resulting non-standard symbols and standard symbols of the test data are combined by MUX 40, and are then written to the optical storage medium 60 by the mastering apparatus 50. As a result, the test data contains one or more non-standard symbols on an ECC block basis. For the authentication operation, the test data is written repeatedly by an amount of about one track, or several groups of test data, each of which consists of its own identical test data, are written by an amount of about one track.

On the other hand, the control program, whose function is to control the processes for authentication of the optical storage medium, is ECC-encoded by the CIRC encoder 10, EFM-modulated, and finally written to the optical storage medium. At this time, original parity symbols are generated and used for the CIRC encoding.

Figure 2:
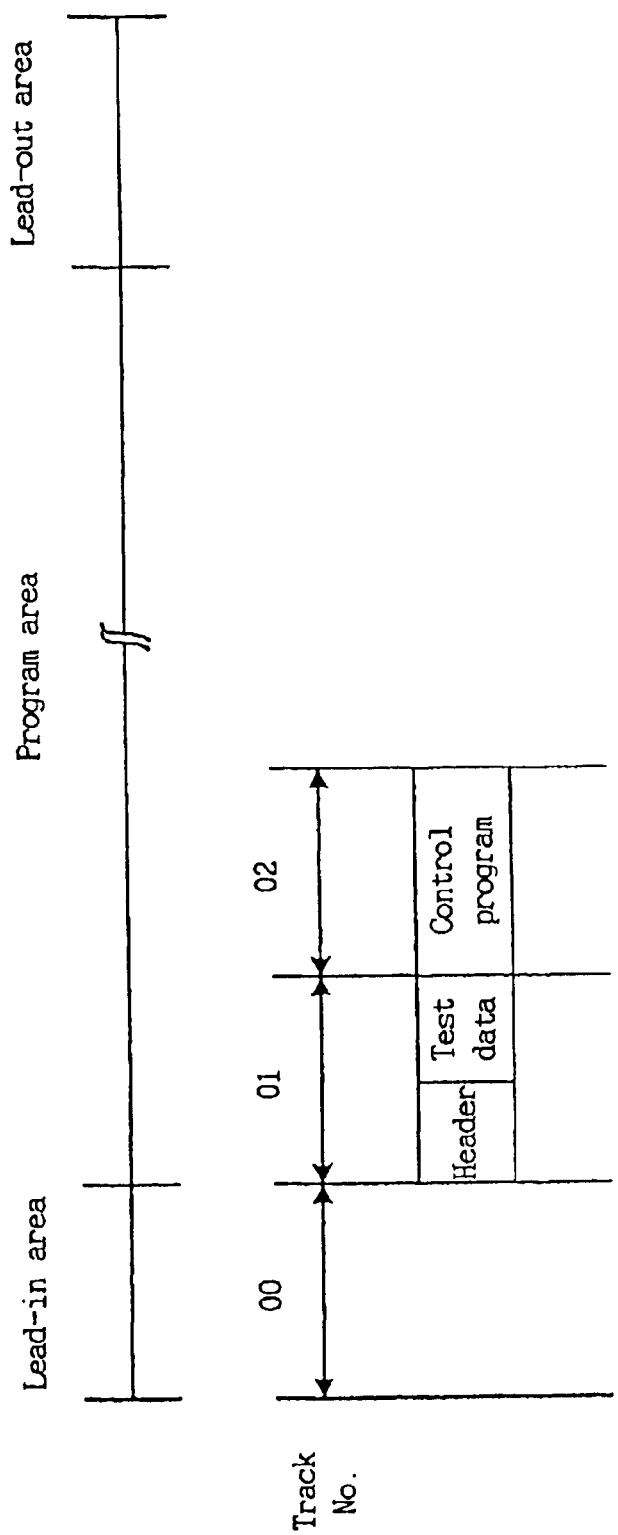
FIG. 2 is a schematic representation showing the writing area of the test data and control program on optical storage medium according to the present invention.

A set of test data and the control program are written to a specified area on the optical storage medium. As shown in FIG. 2, it is preferred that they are written prior to the program area, in which main data are stored, along with a header. The order in which they are written can be changed, and it is preferred that the sizes of the header, the set of test data, and the control program are no more than one or two tracks. The header has information required to install the control program on a host processing unit as well as information on the location of each of the test data and the control program. The installation information can be positioned at the beginning of the area where the control program is written. The format of the test data is dependent on the type of the optical storage medium. Hereinafter, the embodiments of the present invention are described in reference to two types of optical storage medium such as CD-DA and CD-ROM.

In the test data format for CD-DA, there is at least one non-standard symbol, like the 13-th symbol shown in FIG. 3, in each ECC block (24 symbols). Parity symbols are modified during ECC encoding to guarantee that the two target symbols, which may be reproduced from the non-standard symbol when read out, are not considered as errors, and thus are preserved even after the ECC decoding. The twenty-four symbols of FIG. 3 include the CIRC-encoded test data, and the first and second 4 parity symbols, which are modified C2 and modified C1 parity symbols, respectively. It is possible that more than one non-standard symbol is included in the test data.

On the other hand, the test data format of CD-ROM is shown in FIG. 4. The format is identical to that of FIG. 3 except that EDC after the 98-th, 24-symbol ECC clock is CIRC-encoded with the modified parity symbol.

Next, the method of determining and generating the test data is explained in detail referring to FIGS. 1, 5A, 5B, and 6.

First, let us consider that one non-standard symbol is contained in the test data. As shown in FIG. 5A, two target codes of 24 symbols (A code and B code) and two 4-symbol parties associated with the two codes are chosen. The two target codes, A and B must be selected such that, after EFM-modulation, two consecutive bits are different from each other like "01" or "10", and the bits other than the two consecutive bits are common. (The "0" of FIGS. 5A–5B represents an 8-bit binary digit or "00000000", which is 8-to-14 modulated into "01001000100000". Note, only the two consecutive bits of EFM-modulated symbol x and EFM-modulated symbol y are different).

For example, as shown in FIG. 6, decimal numbers of "105" and "112" as a candidate pair for symbol x and symbol y because they are EFM-modulated to "10000001000010" and "10000000100010", respectively. Namely, the two target codes only differ by one "0" between consecutive 1s. The two target codes (A and B) are chosen by taking into account the minimum distance property of the error correction code. Because 4 parity symbols are used, the minimum distance of the error correction code, $d_{min}$, is equal to or greater than 5, and thus the two 4-symbol parities, (c,d,e,f) and (g,h,i,j), associated with the two target codes of FIG. 5A must be different from each other.

If the A code is inputted to the CIRC encoder 10, 4-symbol parity of (c,d,e,f) is generated and then used by the modified parity generator 15 to produce a modified 4-symbol parity by combining the parity of (c,d,e,f) and a 4-symbol parity of (g,h,i,j) associated with the B code. In the case that a CIRC decoder is set such that two symbols are error-corrected, a modified parity of (c,d,i,j) is generated and used in the ECC encoding of test data. As a result, "00-0a00 - - - 0cdij" is EFM-modulated, where "a" represents symbol "x" for A code and symbol "y" for B code.

Then, a predetermined bit in the EFM-modulated code of symbol x, e.g., the 8-th bit of EFM-modulated symbol x of FIG. 6, is shifted by a predetermined length, e.g., 0.5T, by the shifter 30. This results in the EFM-modulated symbol z. Finally, the EFM-modulated symbol z and other EFM-modulated symbols in the test data are combined by MUX 40 to produce record data of "[0][0]-[0]z[0][0] - - - [0][c][d][i][j]", where z means the EFM-modulated symbol of symbol z. The same procedure could be applied to symbol y, except the shift of 0.5T is opposite to that applied to symbol x, but in a preferred embodiment only the symbol x is shifted by the shifter 30.

Next, let us consider that more than one non-standard symbol is contained in test data. Two target codes of 24 symbols (A code and B code of FIG. 5B) are chosen by referring to the minimum distance property of the error correction code. Likewise, the minimum distance of error correction, dmin, is equal to or greater than 5. Thus, in case that the test data contains two non-standard symbols, at least three symbols of the two 4-symbol parities must be different, and if three non-standard symbols are contained in the test data, at least two symbols of the two 4-symbol parities must be different. FIG. 5B illustrates the case where four non-standard symbols are included and two symbols of the two 4-symbol parities are identical for a one-symbol error correction mode.

If A code is inputted to the CIRC encoder 10, two 4-symbol parities which are produced by original CIRC encoder, (c,d,e,f) for A code and (g,h,e,f) for B code are generated and used to produce a modified 4-symbol parity. In case that a CIRC decoder is set such that one symbol is error-corrected, the modified parity of (c,h,e,f) is generated and used in the ECC encoding of test data. As a result, "0x-0xx0-x - - - 0chef" is EFM-modulated. Then, a predetermined bit in the EFM-modulated symbol of every symbol x, e.g., the 8-th bit of EFM-modulated symbol x of FIG. 6, is shifted by a predetermined length by the shifter 30 and transformed to EFM-modulated symbol z. Finally, each of the EFM-modulated symbols z is fed to the MUX 40 together with other EFM-modulated symbols to produce record data of "[0]z-[0]zz[0]-z - - - [0][c][h][e][f]".

Figure 7:
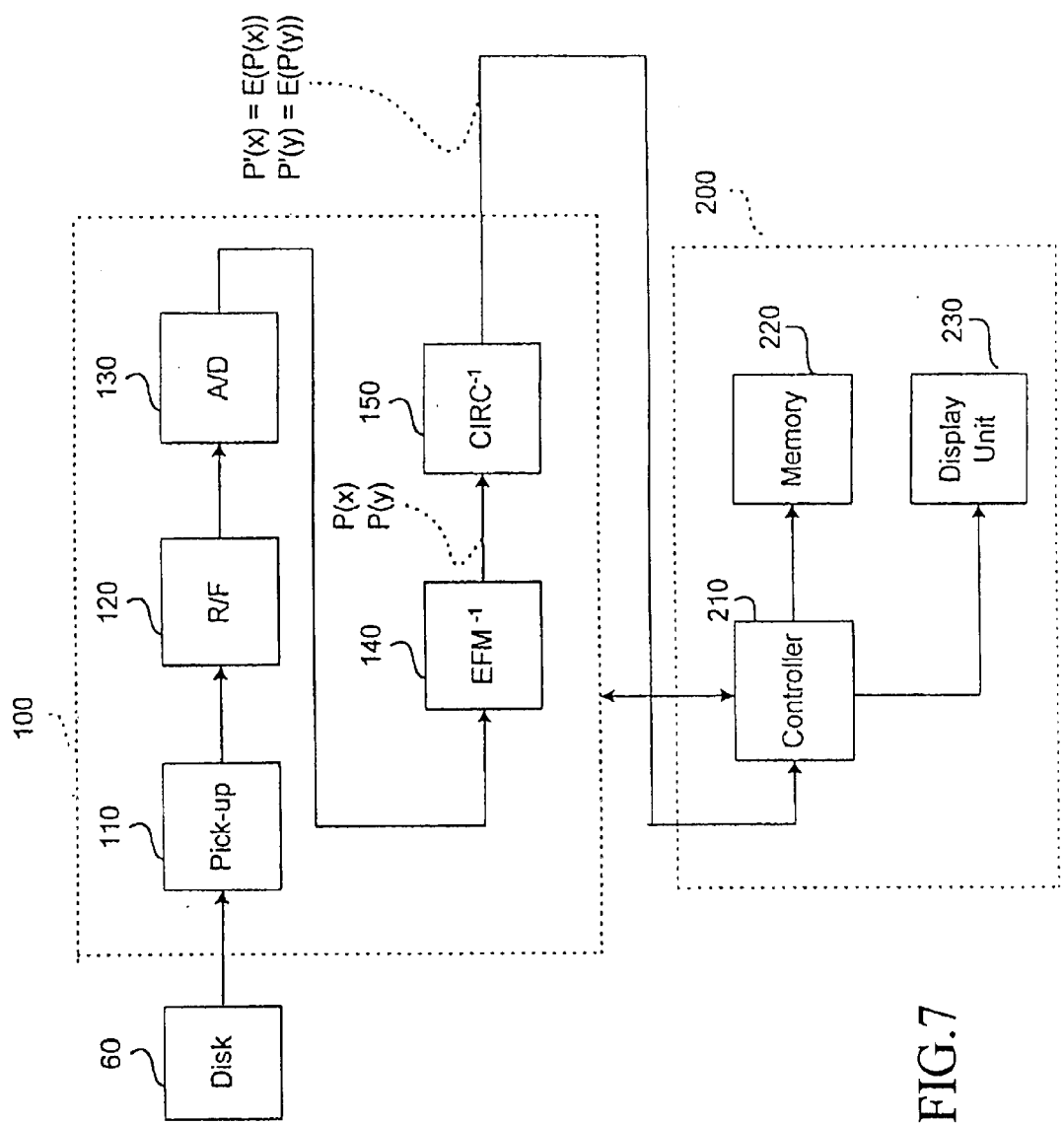
FIG. 7 is a schematic diagram showing a data reproduction device which is used in the apparatus for authentication/copy protection of optical storage medium according to the present invention.

FIG. 7 shows a block diagram of a reproduction device which is used in the apparatus for authentication/copy protection of an optical storage medium according to the present invention. As shown, the device includes an optical pickup 110 for reading out data from the optical disc 60; an R/F circuit 120 for filtering the read-out signal; an A/D converter 130 for digitizing the analog singal from the R/F circuit; an EFM demodulator 140 for 14-to-8 demodulation; a CIRC decoder 150 for error-correcting the EFM-demodulated data; and a host processing unit 200 for examining whether or not an optical disc is genuine by using the test data and control program that are read out from the optical disc. The host processing unit 200 stops playback of the optical disc when it is determined that the disc is not genuine.

The host processing unit 200 includes a controller 210 for controlling operations such as installation of the control program and deciding whether the disc is genuine; a memory 220 in which the control program and the test data are loaded; and a display unit 230 for informing a user that the disc is an illegal copy when it is determined that the disc is not genuine.

The CIRC decoder 150, which is adopted in most CD-like optical disc drivers, has two stages of error correction: C1 decoding and C2 decoding, where 4-symbol parity is used. Given the number of parity symbols, the number of error-correcting symbols and the number of error-detecting symbols are determined according to the chosen operation mode. When the number of parity symbols is 4, the error correction capability is shown in table 1. According to the minimum distance property of error correction code, dmin=(the number of parity symbols+1)>2×the number of error-correcting symbols+the number of error-detecting symbols, the operation modes of C1- and C2-decoder can be configured selectively.

TABLE 1

|  | The number of error-correcting symbols | The number of error-detecting symbols |
| --- | --- | --- |
| mode I | 2 | 0 |
| mode II | 1 | 2 |
| mode III | 0 | 4 |

For operation of the apparatus shown in FIG. 7, the header, the test data and the control program are (1) read out from the optical disc 60 by the optical pickup 110, (2) fed to the R/F circuit 120 to be filtered and then (3) digitized by the A/D converter 130. The output of the A/D converter is 14-to-8 demodulated by the EFM-demodulator 140.

The non-standard symbols, like symbol z of FIG. 6, in the test data on the optical disc are read out and converted to a standard symbol in the form of digital data by the A/D converter 130. The reproduced symbol can be the symbol x or the symbol y as shown in FIG. 6. This is because in the optical disc driver 100 there exists an undefined interval between two pits, say, 8T and 9T in which the reliability of pit reading-out data is not guaranteed. As a result, either symbol x or symbol y is obtained after EFM-demodulation.

Then, the EFM-demodulated data are error-corrected by the CIRC decoder 150, and are then supplied to the host processing unit 200. By using information contained in the error-corrected header (see FIG. 2), the host processing unit 200 installs the control program in the memory 220 along with the test data. The control program causes the host processing unit 200 to examine whether or not there is a change in frequency of A code and B code (FIGS. 5A and 5B) each time the read-out of the test data is performed. Based on the frequency of change, it is determined whether or not the optical disc is genuine.

It should be noted that the high-precision mastering apparatus which is adopted in the present invention is capable of writing non-standard symbols like symbol z of FIG. 6 to the optical disc, on the other hand, if a conventional high-precision mastering apparatus is used to write the symbol z (in the case of illegal coping of the optical disc), one of symbol x and symbol y is written to the optical disc, rather than symbol z.

In the case of a genuine optical disc, when the test data containing symbol z is repeatedly reproduced, both symbol x and symbol y can be reproduced. However, in case that an illegally copied optical disc is intended to be played, one of symbol x and symbol y is consistently reproduced each time symbol z should have been read out as either symbol x or symbol y because the conventional apparatus used in the copying process recorded symbol x or symbol y on the illegally copied disc instead of symbol z. As a result, the frequencies of the two symbols x and y do not change when the test data are repeatedly reproduced.

Let P(x) be the probability that A code is reproduced from a code containing symbol z, and P(y) be the probability that B code is reproduced from the same code containing symbol z. The installed control program checks whether the frequency P'(x) that A code is reproduced from a code containing symbol z and the frequency P'(y) that B code is reproduced from the same code are significantly larger than P(x) and P(y), respectively. If so, the optical disc to be reproduced is discriminated as an illegal-copied optical disc. If P'(x) and P'(y) are not larger, then P'(x) and P'(y) are about the same, and it is determined that the optical disc is genuine.

When it is determined that the disc is not genuine, the control program controls the optical disc driver 100 to stop the disc from being reproduced, and controls the display unit 230 to inform a user that the disc is an illegal copy by means of audio, image, text, or combination thereof.

The method of reproduction of the test data on the optical disc is described below in detail referring to FIGS. 7 and 8A to 8C.

With reference to FIG. 8A, first, it is explained how the recorded data corresponding to test data containing a non-standard symbol, or "[0][0] - - - [0]z[0][0] - - - [0][c][d][i][j]" is reproduced in the error-correction mode I of table 1 in which two symbols are error-corrected. In this case, the two target codes, A and B have only one symbol different, and thus every symbol of their 4-symbol parities is different.

The recorded test data are read out by the optical pickup 110 and are then reproduced as either "00-0x00 - - - 0cdij" or "00-0y00 - - - 0cdij" through the R/F circuit 120, the A/D converter 130, and the EFM demodulator 140. Under the assumption that symbols other than the non-standard symbol z are free from read-out error, the probability P(x) that the recorded data associated with "[0][0] - - - [0]z[0][0] - - - [0][c][d][i][j]" are reproduced as "00-0xa00 - - - 0cdij" is equal to 1−P(y). P(y) denotes the probability that the recorded data associated with "[0][0] - - - [0]z[0][0] - - - [0][c][d][i][j]" are reproduced as "00-0y00 - - - 0cdij". Then, the reproduced test data are error-corrected by the CIRC decoder 150. That is, "00-0x00 - - - 0cdij" is error-corrected as "00-0x00 - - - 0cdef" and "00-0y00 - - - 0cdij" are error-corrected as "00-0y00 - - - 0ghij".

To be specific, in the CIRC decoding, two error symbols, "ij" ("cd") of the reproduced test data "00-0x00 - - - 0cdij" ("00-0y00 - - - 0cdij") are corrected as "ef" ("gh") because each code has only two error symbols and two-symbol error can be corrected in the mode I of the CIRC decoder 150.

Accordingly, the frequency that "00-0x00 - - - 0cdef" is obtained from the recorded test data, P'(x), is equal to P(x), and the frequency that "00-0y00 - - - 0ghij" is obtained from the recorded test data, P'(y), is equal to P(y) or 1−P(x).

The way of reproducing the recorded test data containing N (N>=3) non-standard symbols e.g., "[0]z-[0]zz[0]-z--[0][c][h][e][f]" in error-correction mode II (one-symbol error correction and two-symbol error detection) is described below with reference to FIG. 8B. In this case, Two target codes, A and B have N different symbols and two symbols of their 4-symbol parities are different.

The recorded test data of "[0]z-[0]zz[0]-z--[0][c][h][e][f]" is read out by the optical pickup 110 and can be then reproduced as one of 24 or 16 codes including "0a-0aa0-a--0chef" (where the "a"'s are symbol x or symbol y) by means of the R/F circuit 120, the A/D converter 130, and the EFM demodulator 140. The probability that the recorded test data are reproduced as "0x-0xx0-x--0chef", $P_2(x)$, is given by $P(x)^N$, and the probability that the recorded test data are reproduced as "0y-0yy0y--0chef", $P_2(y)$, is given by $P(y)^N$ (=$[1-P(x)]^N$). The probability that codes other than the two target codes, e.g., "0x-0yy0-y--0chef", "0y-0xy0-y--0chef" are reproduced, P(o), is equal to $1-P(x)^N-P(y)^N$. For example, when N is 4 and P(x) is 0.5, $P_2(x)$ (=$P_2(y)$) and P(o) are 1/16 and 14/16, respectively.

Then, the test data reproduced from the recorded test data are error-corrected by the CIRC decoder 150. That is, "0x-0xx0-x--0chef" ("0y-0yy0-y--0chef") is error-corrected as "0x-0xx0-x--0cdef" ("0y-0yy0-y-0ghef"). Specifically, by the CIRC decoder 150, one error symbol, "h" ("c") of the reproduced code "0x-0xx0-x--0chef" ("0y-0yy0-y--0chef") is corrected as "d" ("g") because each of the reproduced codes has only one error symbol and the error correction mode II (1-symbol error correction and 2-symbol error detection) is adopted. Thus, the probability that "0x-0xx0-x--0cdef" is obtained from the recorded test data, $P_2'(x)$, is equal to $P_2(x)$, and the probability that "0y-0yy0-y--0ghef" is obtained from the recorded test data, $P_2'(y)$, is equal to $P_2(y)$. On the other hand, there exists more than one error symbol in the other reproduced codes such as "0x-0yy0-y--0chef" and "0y-0xy0-y--0chef". As a result, these other codes fail to be error-corrected as either of the two target codes because only one symbol can be corrected in mode II. The probability that the other codes are obtained after the CIRC decoding, P'(o), is equal to P(o).

The way of reproducing the recorded test data containing N (N>=5) non-standard symbols, "[0]z-[0]zz[0]-zz--[0][c][d][e][f]" in the error-correction mode III (no error correction and four-symbol error detection) is described below in reference to FIG. 8C. In this case, N symbols of the two target codes are different and thus four symbols of their 4-symbol parities are all the same.

The recorded test data of "[0]z-[0]zz[0]-zz--[0][c][d][e][f]" are read out by the optical pickup 110 and then can be reproduced as one of 25 or 32 codes including "0x-0xx0-xx--0cdef" and "0y-0yy0-yy--0cdef" by means of the R/F circuit 120, the A/D converter 130, and the EFM demodulator 140. The probability that the recorded test data are reproduced as "0x-0xx0-xx--0cdef", $P_3(x)$, is given by $P(x)^N$, and the probability that the recorded test data are reproduced as "0y-0yy0-yy--0cdef", $P_3(y)$, is given by $P(y)^N$ ($=[1-P(x)]^N$). The probability that other codes, e.g., "0x-0yy0-yy--0cdef" and "0y-0xy0-yy--0cdef", are reproduced, P(o), is equal to $1-P(x)^N-P(y)^N$. When N is 5 and P(x) is 0.5, $P_3(x)$ ($=P_3(y)$) and P(o) are 1/32 and 30/32, respectively.

The test data reproduced from the recorded test data are error-corrected by the CIRC decoder 150. For example, "0x-0xx0-xx--0cdef" ("0y-0yy0-yy--0cdef") is error-corrected as "0x-0xx0-xx--0cdef" ("0y-0yy0-yy--0cdef"). The probability that "0x-0xx0-xx--0cdef" is obtained from the recorded test data, $P_3'(x)$ is equal to $P_3(x)$, and the probability that "0y-0yy0-yy--0cdef" is obtained from the recorded test data, $P_3'(y)$, is equal to $P_3(y)$. On the other hand, there exist one or more error symbols in the other reproduced codes than the two target codes mentioned above, such as "0x-0yy0-yy--0cdef" and "0y-0xy0-yy--0cdef". As a result, these other codes fail to be error-corrected as either of the two target codes because no symbol can be corrected in mode III. The probability that the other codes are obtained after CIRC decoding, P'(o), is equal to P(o).

CIRC encoding/decoding of the test data according to the present invention is described below in detail with reference to FIGS. 9A to 9I.

Figure 9A:
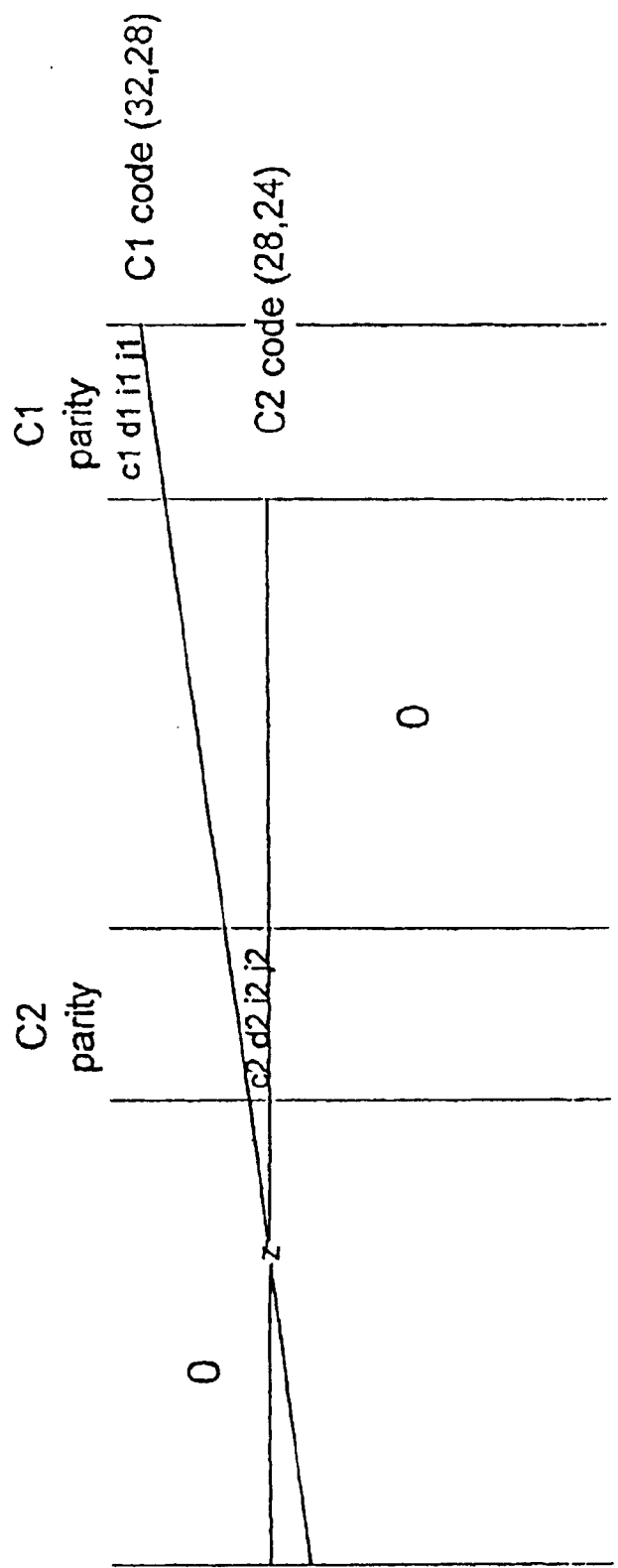
FIGS. 9A to 9I are schematic diagrams showing CIRC encoding process of the test data depending on the error correction mode of CIRC decoder.

FIG. 9A shows an array of data for illustrating the C2- and C1-encoding process which are required to allow both the C1 decoder and C2 decoder to carry out two-symbol error correction. In the C2 encoding under the control of the modified parity generator 15, a modified 4-symbol parity, (c2,d2,i2,j2) is added to a 24-symbol code, which includes one symbol (e.g., x of FIG. 6) at a predetermined position that will be transformed into a non-standard symbol (e.g., symbol z of FIG. 6) by subsequent processing. The C2 encoded data is stored as a block (28XN) in memory. Then, taking symbol by symbol while changing both row and column after each taking, the symbols located in an oblique direction are obtained. Then, the C1 encoder generates, under the control of the modified parity generator, 15, another modified 4-symbol parity, (c1,d1,i1,j1) for a code of 28 symbols located in the oblique direction that contains the non-standard symbol. Every symbol shown in FIG. 9A is "0" except symbols of z, c1,d1,i1,j1,c2,d2,i2, and j2.

When the CIRC-encoded test data are reproduced and error-corrected by the CIRC decoder, the probability that symbol x of FIG. 6 is obtained from the non-standard symbol z at the predetermined position is equal to P(x), and the probability that symbol y of FIG. 6 is obtained is 1−P(x), as shown in No. 1 of FIG. 10, which illustrates a table showing probabilities that each of the target data is obtained from recorded test data depending on the error correction mode of the CIRC decoder. In FIG. 10, "e:" stands for the number of error-correcting symbols and "D:" stands for the number of error-detecting symbols.

Figure 9B:
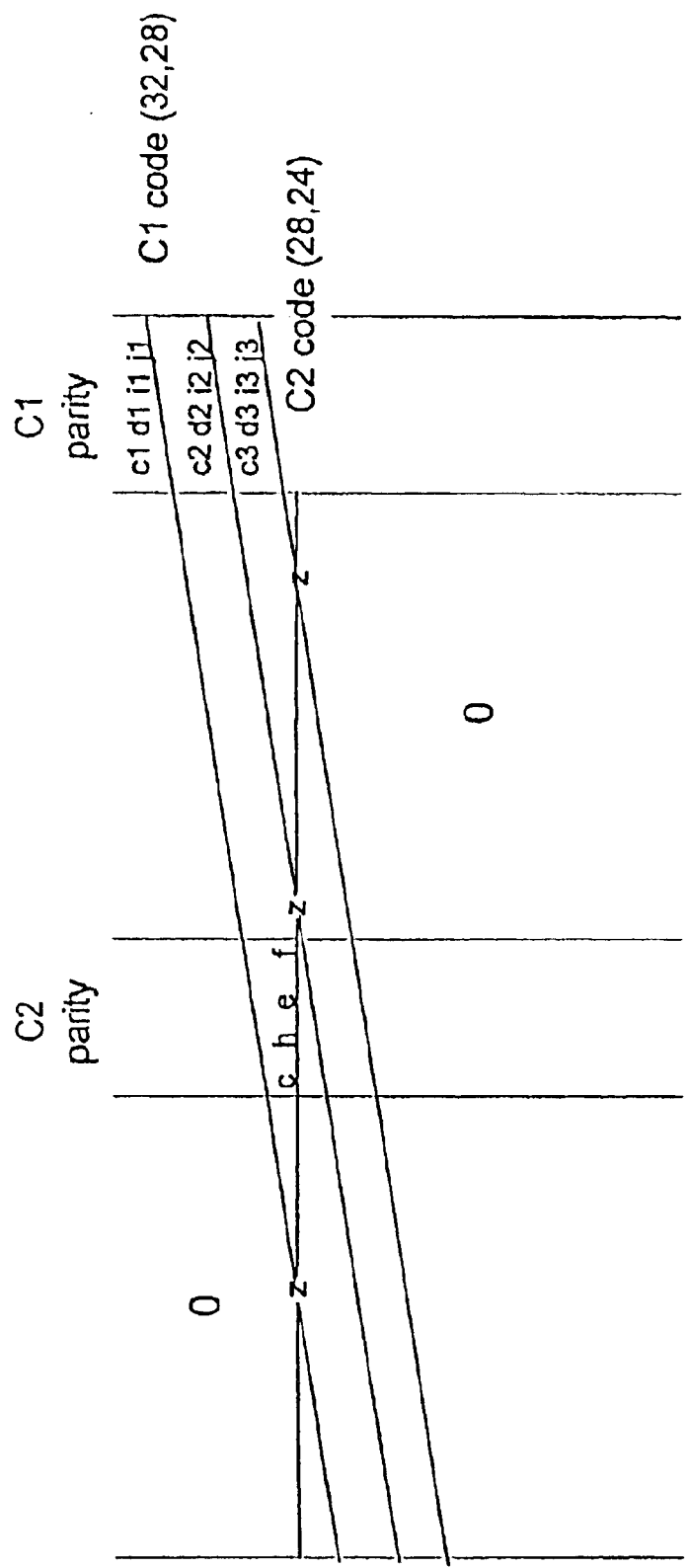

FIG. 9B shows an array of data for illustrating the C2- and C1-encoding process which are required to allow the C1 decoding of mode I and the C2 decoding of mode II. In the C2 encoding, a modified 4-symbol parity, (c,h,e,f) is added to a 24-symbol code, which includes N symbols (here, N is 3) at predetermined positions that will be transformed into non-standard symbols like symbol z of FIG. 6 by the subsequent processing. Then, the C1 encoder modifies original 4-symbol parities to generate modified 4-symbol parities, (c1,d1,i1,j1) for every code of 28 symbols located in the oblique direction that contains the non-standard symbols.

When the CIRC-encoded test data are reproduced and error-corrected by the CIRC decoder, the probability that all of the non-standard symbols at the predetermined positions are reproduced as the symbol x is equal to $P(x)^N$, and the probability that they are all reproduced as the symbol y is $(1−P(x))^N$, as shown in No. 2 of FIG. 10.

Figure 9C:
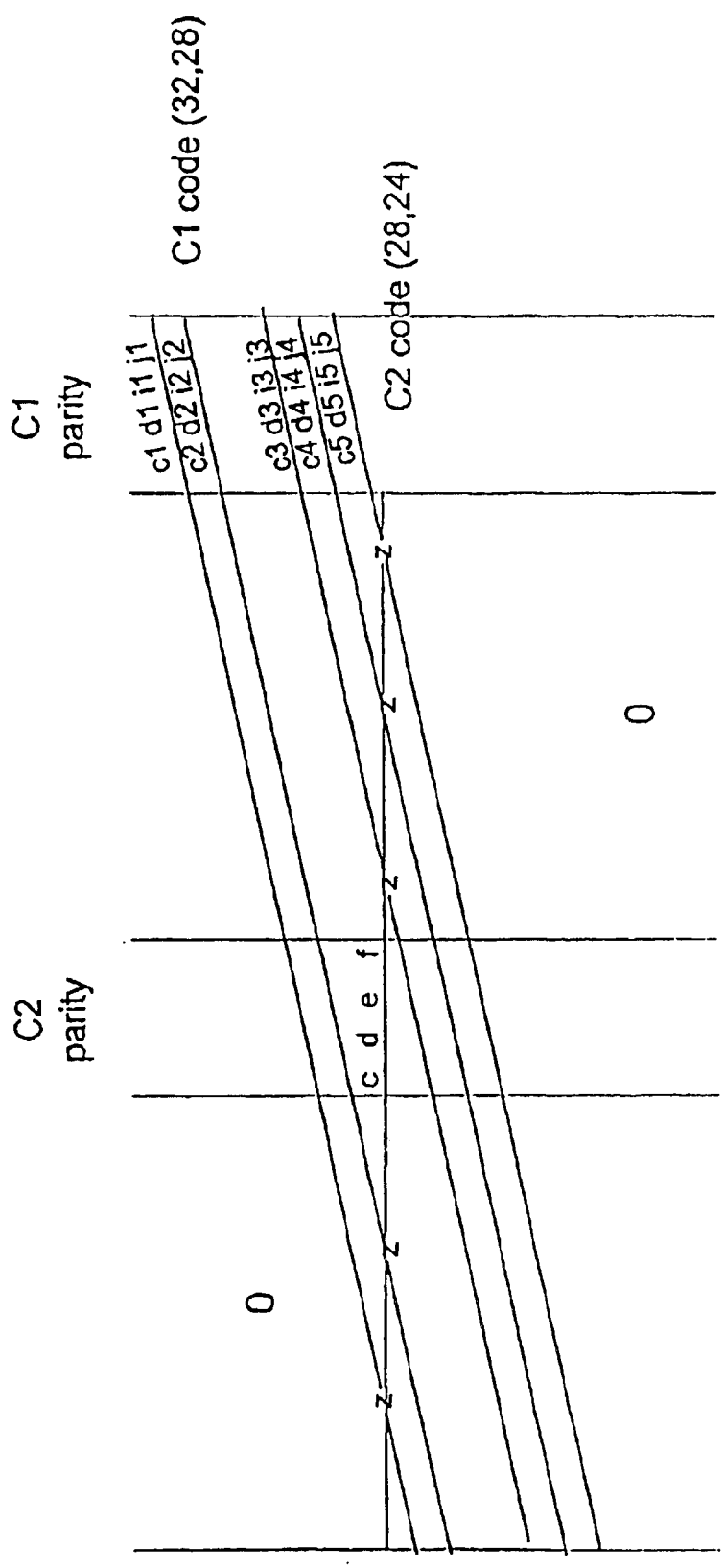

FIG. 9C shows an array of data for illustrating the C2- and C1-encoding process which are required to allow the C1 decoding of mode I and the C2 decoding of mode III. In the C2 encoding, non-modified 4-symbol parity, (c,d,e,f) is added to a 24-symbol code, which includes M symbols (here, M is 5) at predetermined positions that will be transformed into non-standard symbols by the subsequent processing. Then, the C1 encoder modifies original 4-symbol parities to generate modified 4-symbol parities, (c1,d1,i1,j1) for every code of 28 symbols located in the oblique direction that contains the non-standard symbols.

When the CIRC-encoded test data are reproduced and error-corrected by the CIRC decoder, the probability that all of the non-standard symbols at the predetermined positions are reproduced as the symbol x is equal to $P(x)^M$, and the probability that they are all reproduced as the symbol y is $(1−P(x))^M$, as shown in No. 3 of FIG. 10.

Figure 9D:
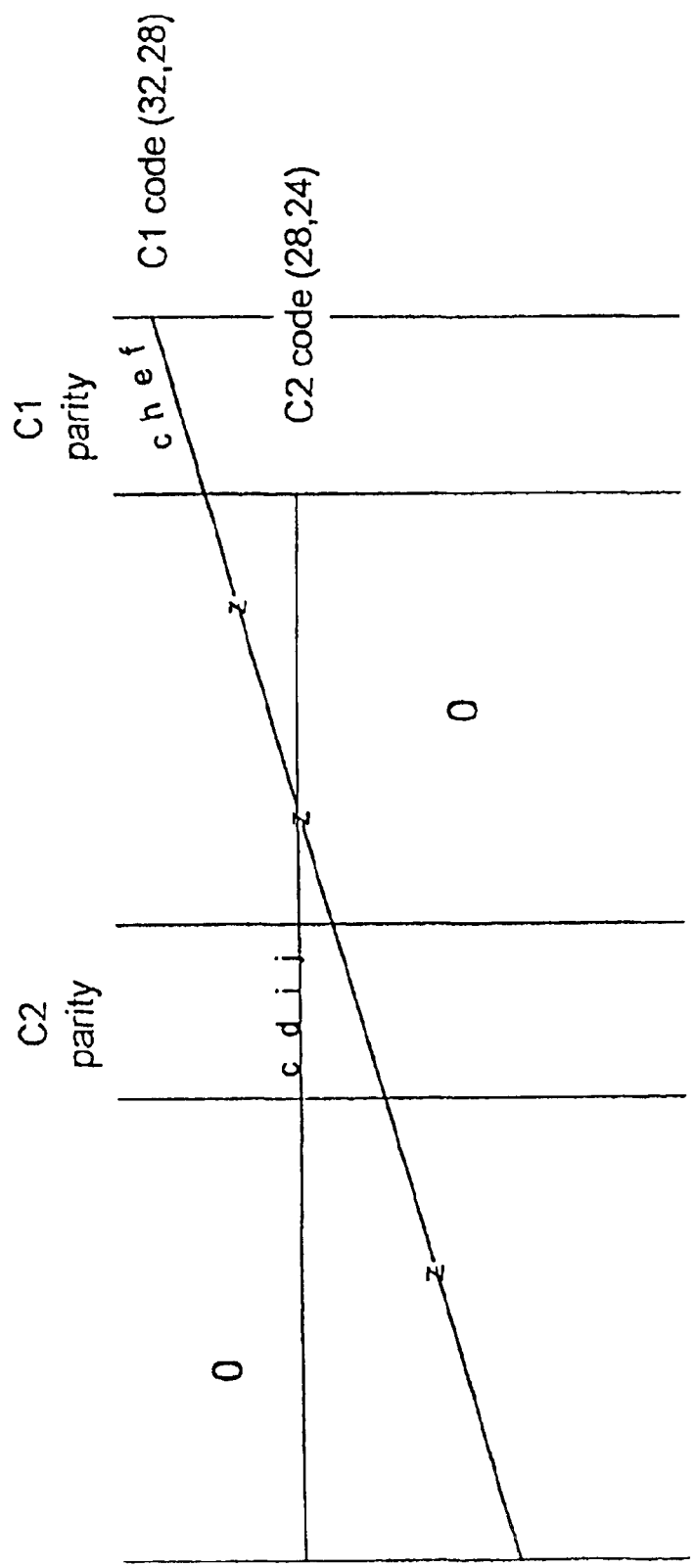

FIG. 9D shows an array of data for illustrating the C2- and C1-encoding process which are required to allow the C1 decoding of mode II and the C2 decoding of mode I. In the C2 encoding, a modified 4-symbol parity, (c,d,i,j) is added to only one 24-symbol code, which includes a symbol that will be transformed into a non-standard symbol by the subsequent processing. Then, the C1 encoder modifies original 4-symbol parity to generate a modified 4-symbol parity, (c,h,e,f) for a code of 28 symbols located in the oblique direction that contains N (here, N is 3) non-standard symbols.

When the CIRC-encoded test data are reproduced and error-corrected by the CIRC decoder, the probability that all of the non-standard symbols at the predetermined positions are reproduced as the symbol x is equal to $P(x)^N$, and the probability that they are all reproduced as the symbol y is $(1-P(x))^N$, as shown in No. 4 of FIG. 10.

Figure 9E:
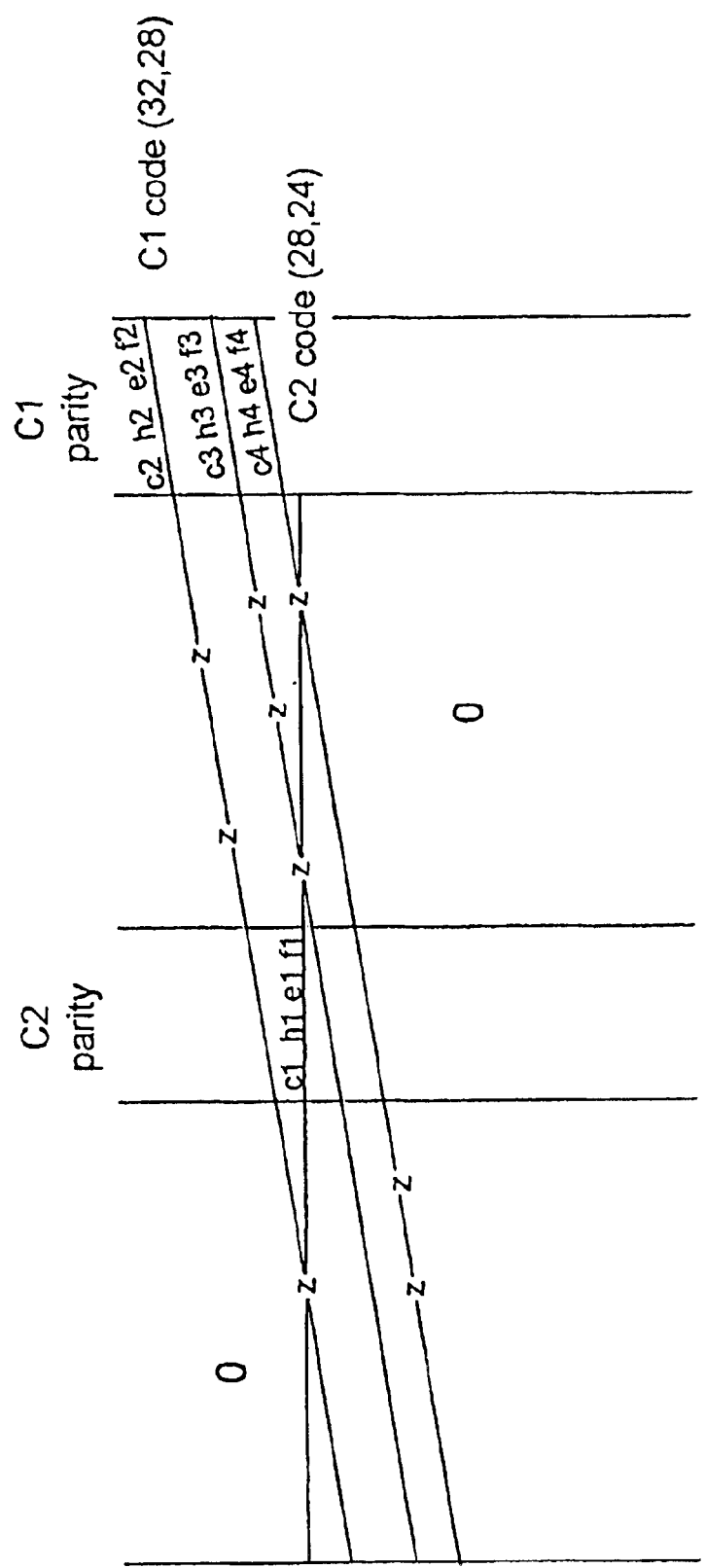

FIG. 9E shows an array of data for illustrating the C2- and C1-encoding process which are required to allow the C1 decoding of mode II and the C2 decoding of mode II. In the C2 encoding, a modified 4-symbol parity, (c1,h1,e1,f1) is added to a 24-symbol code, which includes N (here, N=3) symbols at predetermined positions that will be transformed into non-standard symbols by the subsequent processing. Then, the C1 encoder modifies original 4-symbol parities to generate modified 4-symbol parities, (c2,h2,e2,f2) for every code of 28 symbols located in the oblique direction that contains N (here, N is 3) non-standard symbols.

When the CIRC-encoded test data are reproduced and error-corrected by the CIRC decoder, the probability that all of the non-standard symbols at the predetermined positions are reproduced as the symbol x is equal to $P(x)^{N*N}$, and the probability that they are all reproduced as the symbol y is $(1-P(x))^{N*N}$, as shown in No. 5 of FIG. 10.

Figure 9F:
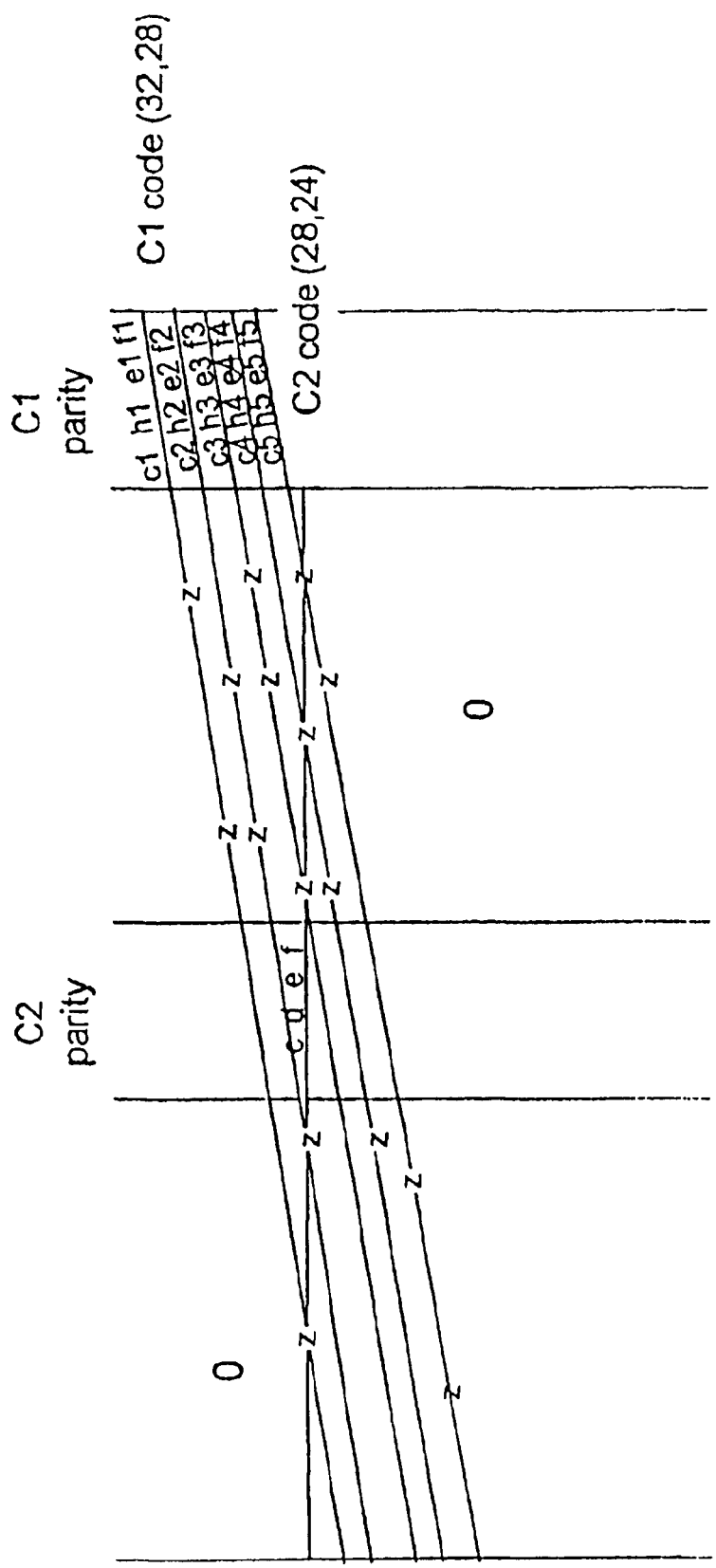

FIG. 9F shows an array of data for illustrating the C2- and C1-encoding process which are required to allow the C1 decoding of mode II and the C2 decoding of mode III. In the C2 encoding, non-modified 4-symbol parity, (c,d,e,f) is added to a 24-symbol code, which includes M (here, M=5) symbols at predetermined positions that will be transformed into non-standard symbols by the subsequent processing. Then, the C1 encoder modifies original 4-symbol parities to generate modified 4-symbol parities, (c1,h1,e1,f1) for every code of 28 symbols located in the oblique direction that contains N (here, N is 3) non-standard symbols.

When the CIRC-encoded test data are reproduced and error-corrected by the CIRC decoder, the probability that all of the non-standard symbols at the predetermined positions are reproduced as the symbol x is equal to $P(x)^{M*N}$, and the probability that they are all reproduced as the symbol y is $(1-P(x))^{M*N}$, as shown in No. 6 of FIG. 10.

Figure 9G:
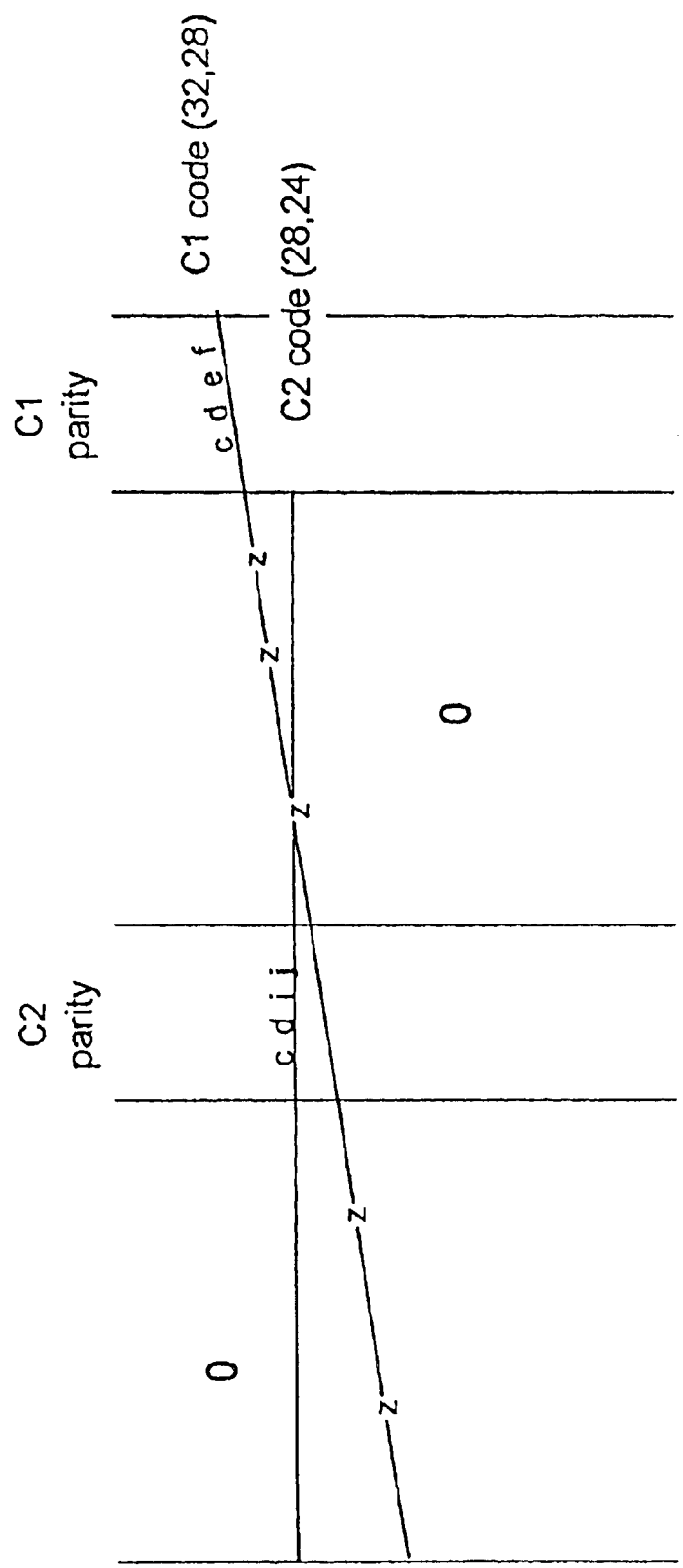

FIG. 9G shows an array of data for illustrating the C2- and C1-encoding process which are required to allow the C1 decoding of mode III and the C2 decoding of mode I. In the C2 encoding, a modified 4-symbol parity, (c,d,i,j) is added to only one 24-symbol code, which includes a symbol that will be transformed into a non-standard symbol by the subsequent processing. Then, the C1 encoder generates a non-modified 4-symbol parity, (c,d,e,f) for a code of 28 symbols located in the oblique direction that contains M (here, M is 5) non-standard symbols.

When the CIRC-encoded test data are reproduced and error-corrected by the CIRC decoder, the probability that all of the non-standard symbols at the predetermined positions are reproduced as the symbol x is equal to $P(x)^M$, and the probability that they are all reproduced as the symbol y is $(1-P(x))^M$, as shown in No. 7 of FIG. 10.

Figure 9H:
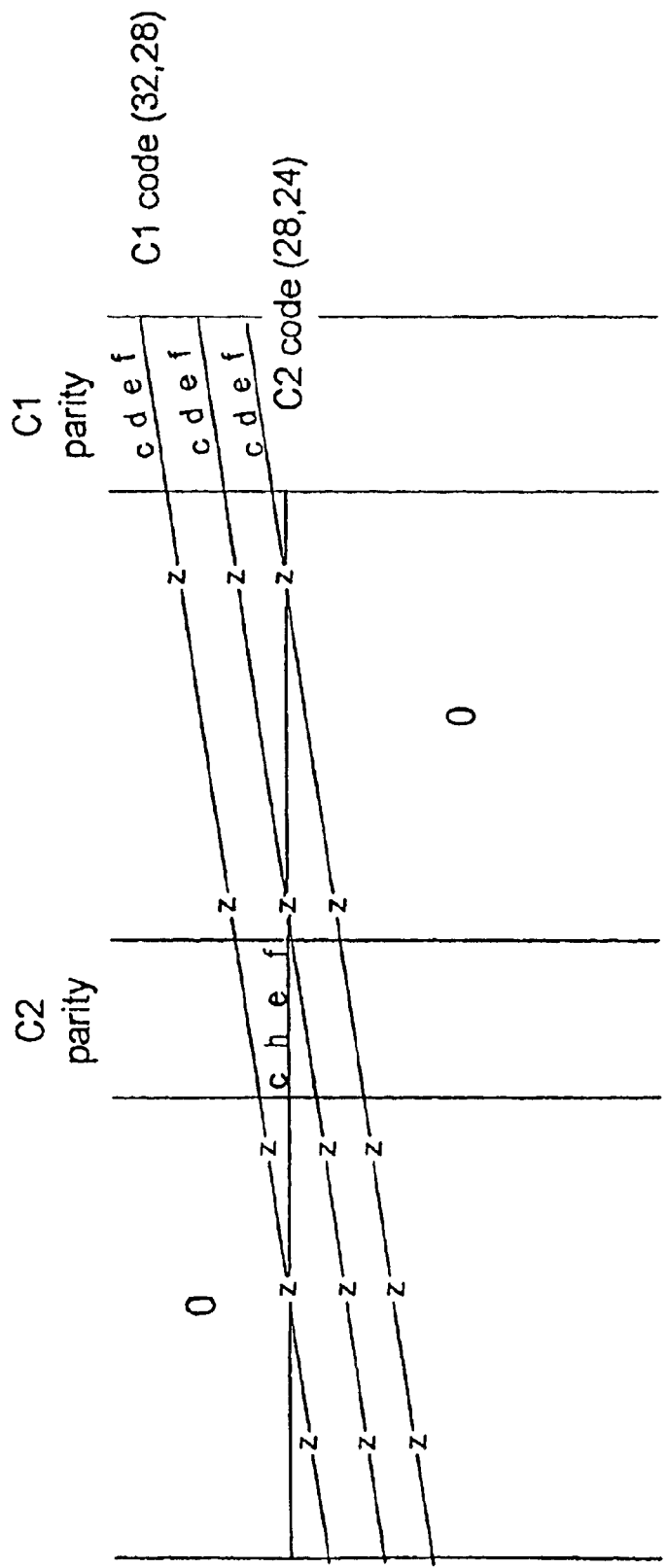

FIG. 9H shows an array of data for illustrating the C2- and C1-encoding process which are required to allow the C1 decoding of mode III and the C2 decoding of mode II. In the C2 encoding, a modified 4-symbol parity, (c,h,e,f) is added to a 24-symbol code, which includes N (here, N=3) symbols at predetermined positions that will be transformed into non-standard symbols by the subsequent processing. Then, the C1 encoder generates non-modified 4-symbol parities, (c,d,e,f) for every code of 28 symbols located in the oblique direction that contains M (here, M is 5) non-standard symbols.

When the CIRC-encoded test data are reproduced and error-corrected by the CIRC decoder, the probability that all of the non-standard symbols at the predetermined positions are reproduced as the symbol x is equal to $P(x)^{M*N}$, and the probability that they are all reproduced as the symbol y is $(1-P(x))^{M*N}$, as shown in No. 8 of FIG. 10.

Figure 9I:
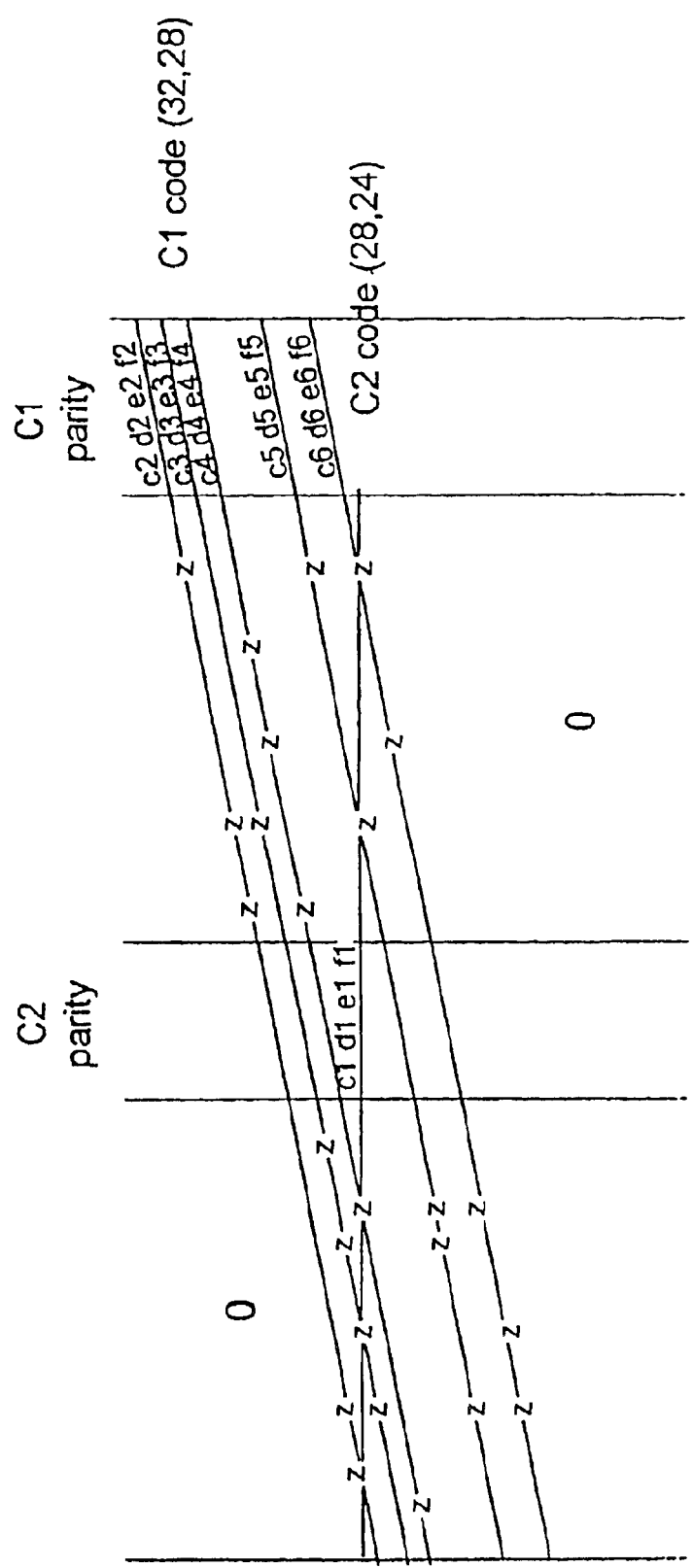

FIG. 9I shows an array of data for illustrating the C2- and C1-encoding process which are required to allow the C1 decoding of mode III and the C2 decoding of mode III. In the C2 encoding, a non-modified 4-symbol parity, (c1,d1,e1,f1) is added to a 24-symbol code, which includes M (here, M=5) symbols at predetermined positions that will be transformed into non-standard symbols by the subsequent processing. Then, the C1 encoder generates non-modified 4-symbol parities, (c2,d2,e2,f2) for every code of 28 symbols located in the oblique direction that contains M (here, M is 5) non-standard symbols.

When the CIRC-encoded test data are reproduced and error-corrected by the CIRC decoder, the probability that all of the non-standard symbols at the predetermined positions are reproduced as the symbol x is equal to $P(x)^{M*M}$, and the probability that they are all reproduced as the symbol y is $(1-P(x))^{M*M}$, as shown in No. 9 of FIG. 10.

The method for selecting the target codes and parity which are required for the embodiments of the present invention is described below.

The foregoing description has used symbols 105 and 112 ("10000001000010" and "10000000100010" in the form of EFM-modulated code) as a pair of target symbols. Nine pairs of target symbols shown in table 2 can be used as well.

TABLE 2

| | symbol x | | | symbol y | | |
|---|---|---|---|---|---|---|
| No | Decimal | Binary code | EFM-modulated code | Decimal | Binary code | EFM-modulated code |
| 1 | 144 | 10010000 | 10000000100001 | 217 | 11011001 | 10000000010001 |
| 2 | 112 | 01110000 | 10000000100010 | 249 | 11111001 | 10000000010010 |
| 3 | 188 | 10111100 | 01000000001001 | 220 | 11011100 | 01000000010001 |
| 4 | 58 | 00111010 | 10010000001000 | 90 | 01011010 | 10010000000100 |
| 5 | 73 | 01001001 | 10000001000100 | 80 | 01010000 | 10000000100100 |
| 6 | 81 | 01010001 | 1000001000C | 105 | 01101001 | 10000001000 |

TABLE 2-continued

| | | symbol x | | | symbol y | |
|---|---|---|---|---|---|---|
| No | Decimal | Binary code | EFM-modulated code | Decimal | Binary code | EFM-modulated code |
| 7 | 59 | 00111011 | 010 10001000001 000 | 91 | 01011011 | 010 10001000000 100 |
| 8 | 191 | 10111111 | 00100000001 001 | 223 | 11011111 | 00100000010 001 |
| 9 | 230 | 11100110 | 01000000100 010 | 252 | 11111100 | 01000000010 010 |

For the mode of one-symbol error correction, two 4-symbol parities associated with a pair of target codes must have two common symbols. The probability that two symbols of the two 4-symbol parities are identical is equal to $1/(256*256)*_4C_2=1/10922$. Besides, at least three symbols of two 24-symbol target codes must be different due to the property of error correction code. Eighteen symbols from the nine pairs of table 2 can be used as sources for the three different symbols. Therefore, when the other 21 symbols are determined, $_{24}C_3*18^3$ (=118039698) is the total number of codes to search for pairs of the required target codes having 4-symbol parities of two common symbols. It should be noted that the two required target codes have three pairs of different symbols, each of which corresponds to one pair among the nine pairs of target symbols shown in table 2.

However, the number of common symbols between two parities does not change even when elements of the pairs of different symbols are exchanged between the two target codes. In addition, there exist a few pairs of target symbols which have identical GF (Galois Field) sum and thereby preserve the number of common symbols between two parities even if one is replaced by the other. These are (188,220), (58,90), (59,91) and (191,223). Therefore by using the linearity of ECC above, 18 candidates of target symbols shown in table 2 are reduced to 6 target symbols: 144, 112, 188, 73, 81, and 230. Thus, the total number of codes to search reduces to $_{24}C_3*6^3$=437184, and the computation time to find required pairs of target codes is reduced by a factor of 27; which takes about 10 minutes on SUN Ultra Sparc 1.

For the mode of no error correction or when there are more than four non-standard symbols in a 24-symbol code, two 4-symbol parities associated with a pair of target codes must be the same. The probability that four symbols of the two 4-symbol parities are identical is equal to $1/(256*256*256*256)=1/4294967296$. Besides, at least five symbols of the two 24-symbol target codes must be different due to the ECC property. Therefore, when the other 19 symbols are fixed, the total reduced number of codes to search becomes $_{24}C_5*6^3$=33051104. Thus, the computation time to find required pairs of target codes is reduced by a factor of 243; which takes about 400 minutes on SUN Ultra Sparc 1.

Figure 11:
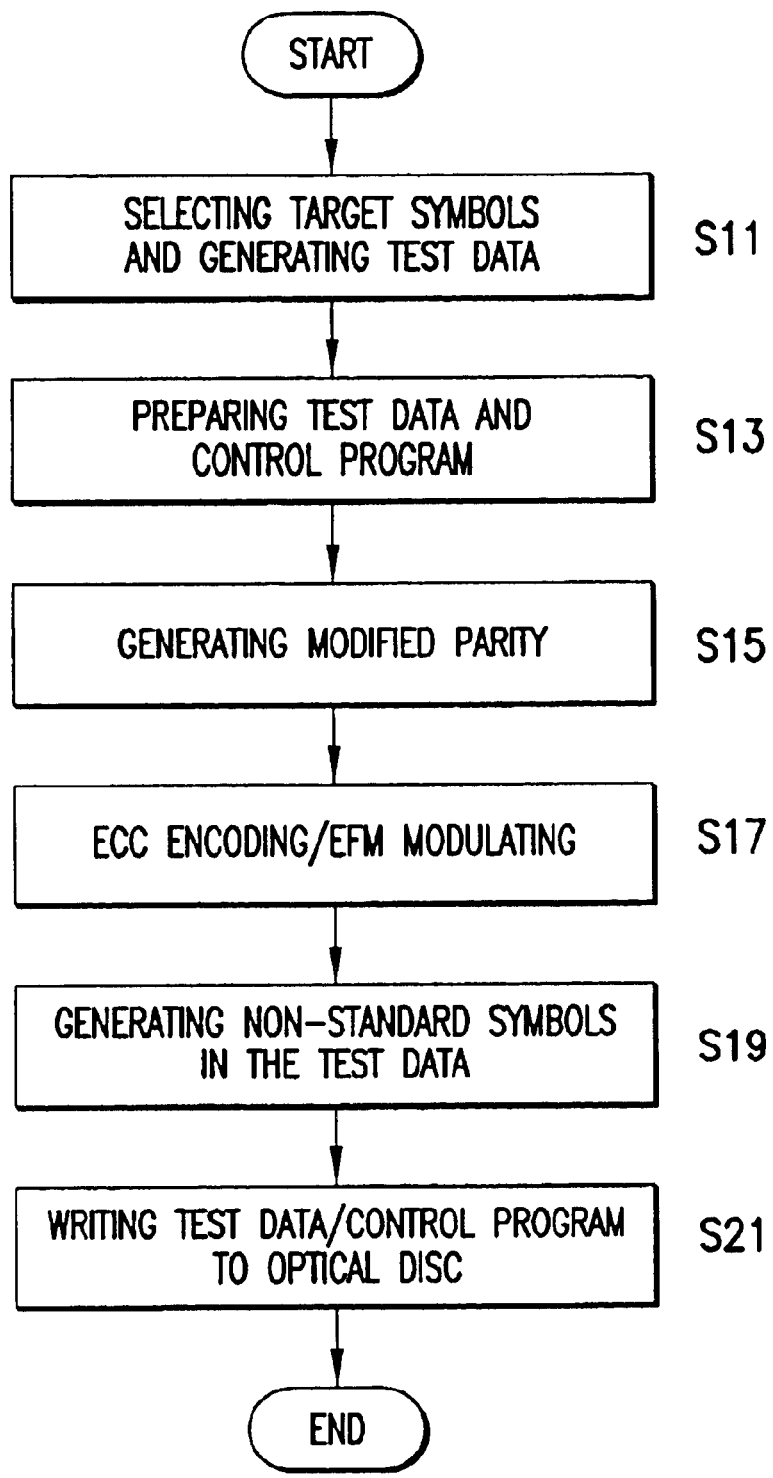
FIG. 11 is a flow chart of the method for writing test data and a control program to an optical storage medium according to present invention.

The method for writing the test data and control program to an optical storage medium is described below in detail referring to a flow chart of FIG. 11.

First, in order to generate non-standard symbols, one or more pairs of target symbols are chosen out of pairs of target symbols shown in table 2. A 24-symbol code or test data is made by using one or more target symbols which are selected from the chosen pairs of target symbols and "0's" for the other remaining symbols (STEP S11). Thus, a pair of target codes is composed of two 24-symbol codes, target symbols of which are different elements of the same pair of target symbols, and the other symbols of which are all "0".

Then, a set of the test data and the control program for controlling the authentication process are supplied to the apparatus of FIG. 1, along with the header that contains information required to install the control program to the host processing unit 200 and to locate each of test data and the control program (STEP S13). The original parity symbols are generated for the input data, and for each of the test data the modified parity symbols are generated, as shown in FIGS. 5A and 5B (STEP S15).

The test data are CIRC-encoded with the modified parity symbols, the control program and the header are CIRC-encoded with non-modified parity symbols, and the CIRC-encodation results are EFM-modulated (STEP S17).

For each of EFM-modulated symbols corresponding to target symbols in the test data, the non-zero bit among the two different consecutive bits is shifted by a predetermined length, e.g., 0.5T, resulting in a non-standard symbol, like symbol z of FIG. 6. By multiplexed control, the non-standard symbol is combined with other standard symbols to produce the test data to be recorded (STEP S19). Finally, a set of the test data having non-standard symbols is inputted to the mastering apparatus to be written to the optical storage medium, along with the control program and the header (STEP S21).

Figure 12:
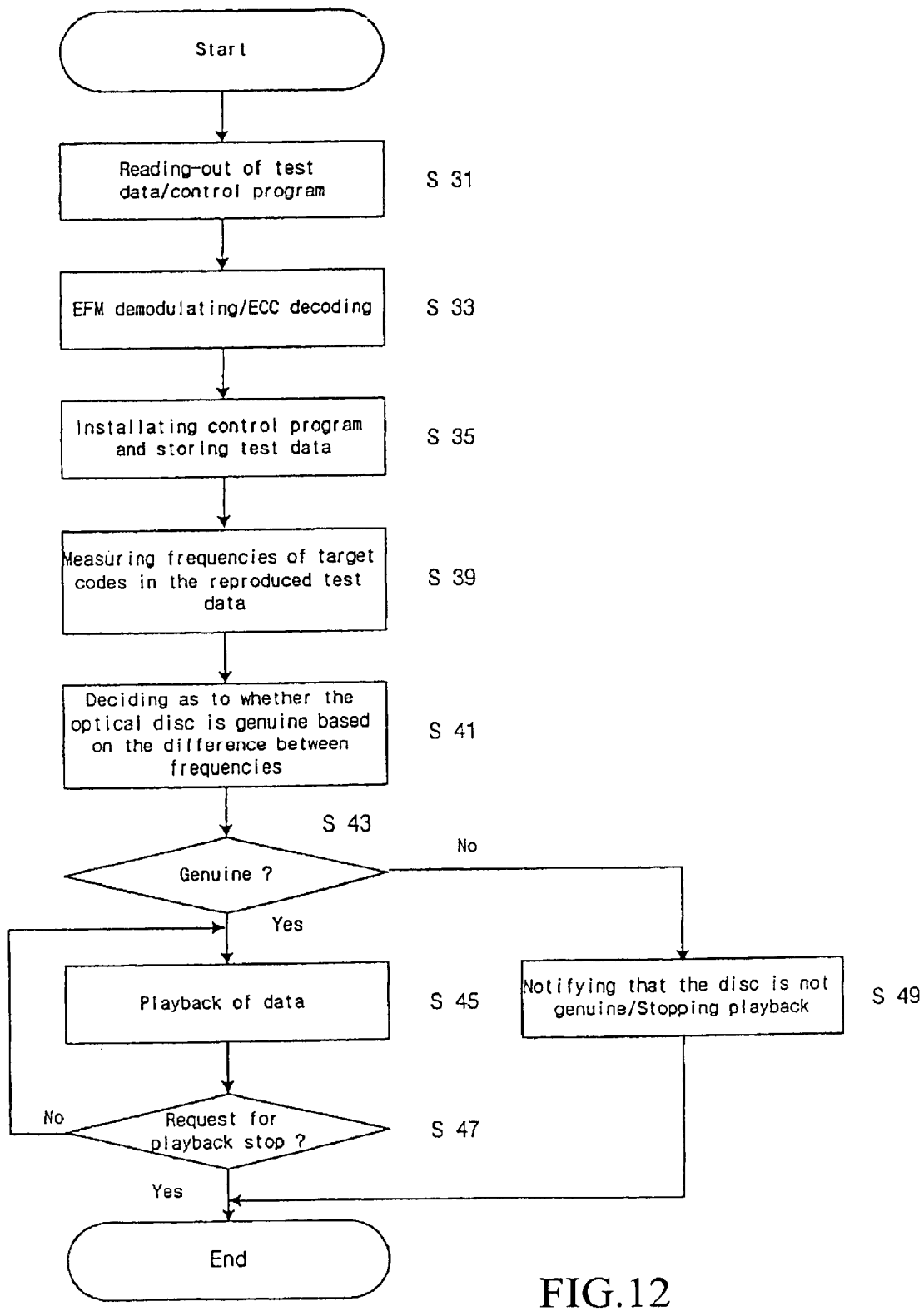
FIG. 12 is a flow chart of the overall authentication/copy protection process according to the present invention.

The method for authenticating an optical storage medium by using the test data and the control program thereon is described below referring to a flow chart of FIG. 12.

First, the header, the test data, and the control program are read out from the optical storage medium by the optical pickup 110 (STEP S31). Then, they are converted to 8-bit data by passing through the R/F circuit 120, the A/D converter 130, and the EFM-demodulator 140. Error correction is then carried out by the CIRC decoder 150 (STEP S33). The test data are processed by the error correction procedure shown in FIGS. 8A to 8C and FIGS. 9A to 9I.

The CIRC-decoded header, test data, and control program are fed to the host processing unit 200, which loads the test data and control program in the memory 220 on the basis of information contained in the header (STEP S35). Then, the host processing unit 200 under the control of the control program reads out the test data a predetermined number of times to gather data needed for the authentication process. Based on the repeatedly read-out test data, the host processing unit 200 examines the frequencies of the two target codes that are read out at the same locations on the optical storage medium (STEP S39).

It depends on the difference of the frequencies of the two target codes whether or not the optical disc is genuine (STEPS S41, S43). If the optical disc is genuine, the difference of the frequencies is not equal to the number of times the test data is read-out because either of the target codes could be obtained when the test data are repeatedly read out. On the other hand, if the disc is an illegally-copied disc, only one target code is obtained when the test data is repeatedly read out, and thus the difference of frequencies becomes equal to the number of times the test data is read-out.

When it is determined that the disc is genuine, optical disc driver 100 is allowed to read out data from the disc for playback (STEP S45). Once a user stops the playback, the playback stops (STEP S47). On the other hand, if it is determined that the disc is not genuine, the control program causes the host processing unit 200 to control the optical disc driver 100 to prevent the disc from being reproduced. The host processing unit 200 then informs a user that the disc is an illegal copy by means of audio, image, text, or combination thereof (STEP S49).

Although foregoing embodiments have been described with a set of test data of about one or more tracks, the present invention can be embodied even when the size of the test data is one ECC block or one sector, if the recorded test data contains at least one non-standard symbol.

Although foregoing embodiments have been described with reference to CD-DA and CD-ROM in which 8-to-14 modulation/demodulation is adopted, the present invention can be applied to Digital Versatile Disk (DVD) using 8-to-16 modulation/demodulation. In addition, the present invention can be used in any other optical storage media if, in the writing operation, there exist at least one pair of two codes, every bit of which is common except two consecutive bits, which are different from each other.

The foregoing embodiments concerning FIGS. 9A to 9I have been described with "0" being used as symbols other than the non-standard symbol in the test data; however, other values than "0" can be used.

The foregoing is provided only for the purpose of illustration and explanation of the preferred embodiments of the present invention, so changes, variations and modifications may be made without departing from the spirit and scope of the invention.

What is claimed is:

1. A method of recording data in a copy protected manner on an optical disk, comprising:
   modifying at least a first signal in data such that said modified first signal is reproduced as one of a plurality of target signals prior to error correction decoding;
   error correcting encoding said data prior to said modifying such that such reproduced target signals remain unchanged after error correction decoding; and
   writing said modified encoded data on an optical storage medium.

2. The method of claim 1, wherein said plurality of target signals include a first target signal and a second target signal.

3. The method of claim 2, wherein said first target signal is the same as said first signal.

4. The method of claim 2, wherein
   said first and second target signals form part of first and second target codes, respectively, when reproduced; and
   said error correcting encoding encodes said data such that, when reproduced, said first and second target codes have at least one common parity symbol prior to error correction decoding.

5. The method of claim 4, wherein said error correcting encoding encodes said data such that, when reproduced, said first and second target codes have at least one more parity symbol in common prior to error correction decoding than after error correction decoding.

6. The method of claim 2, wherein
   said first and second target signals form part of first and second target codes; and
   said error correcting encoding generates first parity symbols for a first code including said first signal, said first code being a same code as said first target code, and modifies said first parity symbols such that at least one of said modified parity symbols is in common with second parity symbols which would be generated for said second target code.

7. The method of claim 6, wherein said error correcting encoding modifies said first parity symbols such that a number of said modified first parity symbols in common with said second parity symbols is greater than a number of said first parity symbols in common with said second parity symbols.

8. The method of claim 6, wherein said first and second target signals have a same galois sum.

9. The method of claim 2, wherein said first and second target signals have a same galois sum.

10. The method of claim 2, wherein said first and second target signals differ in a number of zeros between consecutive ones.

11. The method of claim 1, wherein a number of said first signal in said data is set based on an expected error correcting capability of an optical disk reproducing apparatus.

12. The method of claim 1, wherein said modifying step modifies said first signal and a second signal in said data such that said modified first signal and said modified second signal are reproduced as one of said plurality of target signals prior to error correction coding, and said data includes at least one first code and at least one second code, said first code including at least one said first signal and said second code including at least one said second signal.

13. The method of claim 12, wherein a first number of said first signal in said first code and a second number of said second signal in said second code both depend on an expected error correcting capability of an optical disk reproducing apparatus.

14. The method of claim 12, further comprising:
   choosing at least one pair of standard symbols from a list containing a plurality of pairs of standard symbols, each pair of standard symbols in said list including a first symbol and a second symbol differing in a number of zeros between consecutive ones; and
   generating said data such that said data includes said chosen pair of standard symbols as said first signal and said second signal.

15. The method of claim 1, further comprising:
   choosing at least one pair of standard symbols from a list containing a plurality of pairs of standard symbols, each pair of standard symbols in said list including a first symbol and a second symbol differing in a number of zeros consecutive ones; and
   generating said data such that said data includes at least one symbol of said chosen pair of standard symbols as said first signal.

16. The method of claim 1, wherein said writing step writes said modified encoded data and a control program, said control program instructing how to authenticate said optical disk during reproduction based on said modified encoded data.

17. The method of claim 1, wherein said modifying step shifts a bit in said first signal to generate said modified first signal.

18. A method of recording data in a copy protected manner on an optical disk, comprising:
choosing at least one pair of standard symbols from a list containing a plurality of pairs of standard symbols, each pair of standard symbols in said list including a first symbol and a second symbol differing by a number of zeros between consecutive ones;
first generating first and second codes, said first code including at least one of said first symbol in said chosen pair of standard symbols and said second code including at least one of said second symbol in said chosen pair of standard symbols;
second generating first and second parity symbols for said first and second codes, respectively;
first modifying said first parity symbols;
second modifying said first symbols in said first code; and
writing said modified first code on an optical disk.

19. The method of claim 18, wherein said first modifying step modifies said first parity symbols such that said modified first parity symbols and said second parity symbols have at least one common symbol.

20. The method of claim 19, wherein said first modifying step modifies said first parity symbols such that a number of said modified first parity symbols in common with said second parity symbols is greater than a number of said first parity symbols in common with said second parity symbols.

21. The method of claim 18, wherein said second modifying step converts said first symbols into a non-standard symbol.

22. The method of claim 21, wherein said second modifying step shifts a bit in said first symbols to convert said first symbols into said non-standard symbol.

23. The method of claim 18, wherein said first and second symbol in each pair of standard symbols in said list have a same galois sum.

24. A copy protected recording medium having a data structure stored thereon, comprising:
a test area storing test data, said test data including at least one modified first signal, said modified first signal having been modified such that when said modified first signal is reproduced, said modified first signal is reproduced as one of at least two target signals.

25. The copy protected recording medium of claim 24, wherein said test data includes a first code, said first code including said modified first signal and modified first parity symbols, said modified first parity symbols including at least one symbol in common with parity symbols of a first target code and a second target code, said first and second target codes being a same code except said first target code includes said first target signal at a predetermined position therein and said second target code includes said second target signal at said predetermined position therein.

26. An apparatus for recording data in a copy protected manner on an optical disk, comprising:
a shifter modifying at least a first signal in data such that said modified first signal is reproduced as one of a plurality of target signals prior to error correction decoding;
an encoder error correcting encoding said data prior to said modifying such that said reproduced target signals remain unchanged after error correction decoding; and
a mastering apparatus writing said modified encoded data on an optical storage medium.

27. An apparatus for recording data in a copy protected manner on an optical disk, comprising:
an encoder generating first and second parity symbols for first and second codes, respectively, said first code including at least one of a first symbol and said second code including at least one of a second symbol, said first symbol and said second symbol differing by a number of zeros between consecutive ones, said encoder modifying said first parity symbols;
a shifter modifying said first symbols in said first code; and
a mastering apparatus writing said modified first code on an optical disk.

* * * * *